US006966002B1

(12) United States Patent
Torrubia-Saez

(10) Patent No.: US 6,966,002 B1
(45) Date of Patent: Nov. 15, 2005

(54) METHODS AND APPARATUS FOR SECURE DISTRIBUTION OF SOFTWARE

(75) Inventor: Andres Torrubia-Saez, Alicante (ES)

(73) Assignee: Trymedia Systems, Inc., New York, NY (US)

( * ) Notice: Subject to any disclaimer, the term of this patent is extended or adjusted under 35 U.S.C. 154(b) by 0 days.

(21) Appl. No.: 09/328,737

(22) Filed: Jun. 9, 1999

Related U.S. Application Data

(60) Provisional application No. 60/131,769, filed on Apr. 30, 1999.

(51) Int. Cl.[7] .................. G06F 11/30; G06F 12/14; G06F 17/60; H04L 9/00; H04L 9/32; H04K 1/00
(52) U.S. Cl. .................. 713/201; 713/191; 705/51; 705/52; 717/172
(58) Field of Search .................. 717/172; 705/51, 705/52; 713/201, 191

(56) References Cited

U.S. PATENT DOCUMENTS

| | | | | |
|---|---|---|---|---|
| 4,464,650 | A | | 8/1984 | Eastman et al. ............ 340/347 |
| 4,558,302 | A | | 12/1985 | Welch .................. 340/347 |
| 4,658,093 | A | | 4/1987 | Hellman |
| 4,796,220 | A | | 1/1989 | Wolfe |
| 4,937,863 | A | | 6/1990 | Robert et al. |
| 4,953,209 | A | | 8/1990 | Ryder, Sr. et al. |
| 4,999,806 | A | * | 3/1991 | Chernow et al. ........... 717/177 |
| 5,008,814 | A | * | 4/1991 | Mathur .................. 709/221 |
| 5,051,745 | A | | 9/1991 | Katz .................... 341/51 |
| 5,166,886 | A | * | 11/1992 | Molnar et al. ............ 700/234 |
| 5,199,066 | A | * | 3/1993 | Logan .................. 713/200 |
| 5,222,134 | A | | 6/1993 | Waite et al. |
| 5,224,166 | A | * | 6/1993 | Hartman, Jr. ............ 713/190 |
| 5,287,407 | A | | 2/1994 | Holmes ................. 380/4 |
| 5,287,408 | A | | 2/1994 | Samson ................. 380/4 |
| 5,337,357 | A | * | 8/1994 | Chou et al. .............. 705/56 |
| 5,440,401 | A | | 8/1995 | Parulski et al. ........... 358/342 |
| 5,509,070 | A | | 4/1996 | Schull |
| 5,553,139 | A | | 9/1996 | Ross et al. |
| 5,559,884 | A | | 9/1996 | Davidson et al. ........... 380/4 |
| 5,563,946 | A | | 10/1996 | Cooper et al. |
| 5,564,038 | A | * | 10/1996 | Grantz et al. ............ 711/164 |
| 5,598,470 | A | | 1/1997 | Cooper et al. |
| 5,687,191 | A | | 11/1997 | Lee et al. ............... 375/216 |
| 5,689,560 | A | | 11/1997 | Cooper et al. |

(Continued)

FOREIGN PATENT DOCUMENTS

WO  WO 98/33106  7/1998  ............ G06F 1/00

OTHER PUBLICATIONS

Collberg, et al., "On the Limits of Software Watermarking", *Department of Computer Science*, Technical Report, #164, Aug. 26, 1998.

(Continued)

*Primary Examiner*—Gilberto Barrón, Jr.
*Assistant Examiner*—Benjamin E. Lanier
(74) *Attorney, Agent, or Firm*—Michael A. Glenn; Glenn Patent Group

(57) ABSTRACT

Software is securely distributed with limited usage rights. The software may be an executable program and/or one or more data files such as image or multimedia data files. The software includes an access control object which prevents at least some usage of the software without use of a first access control code. The first access control code is produced based on selected information characteristic of the user's computer system. The access control code is produced in a server computer to which the user directs a request for the access control code. The user makes a payment to receive the access control code, which is then downloaded to the user's computer system.

39 Claims, 25 Drawing Sheets

U.S. PATENT DOCUMENTS

| | | |
|---|---|---|
| 5,708,709 A | 1/1998 | Rose |
| 5,737,416 A | 4/1998 | Cooper et al. |
| 5,745,569 A | 4/1998 | Moskowitz et al. ............ 380/4 |
| 5,757,907 A | 5/1998 | Cooper et al. |
| 5,757,908 A | 5/1998 | Cooper et al. |
| 5,758,068 A | 5/1998 | Brandt et al. |
| 5,771,347 A | 6/1998 | Grantz et al. |
| 5,819,091 A | 10/1998 | Arendt et al. |
| 5,845,281 A | 12/1998 | Benson et al. ................. 707/9 |
| 5,864,620 A | 1/1999 | Pettitt |
| 5,870,543 A | 2/1999 | Ronning |
| 5,875,247 A | 2/1999 | Nakashima et al. |
| 5,883,954 A | 3/1999 | Ronning |
| 5,883,955 A | 3/1999 | Ronning |
| 5,903,647 A | 5/1999 | Ronning |
| 5,903,650 A | 5/1999 | Ross et al. |
| 5,905,860 A | 5/1999 | Olsen et al. |
| 5,907,617 A | 5/1999 | Ronning |
| 5,915,025 A | 6/1999 | Taguchi et al. |
| 5,917,908 A | 6/1999 | Takenaka et al. |
| 5,933,497 A | 8/1999 | Beetcher et al. |
| 5,984,508 A * | 11/1999 | Hurley ....................... 700/237 |
| 5,995,625 A * | 11/1999 | Sudia et al. .................. 705/51 |

OTHER PUBLICATIONS

Collberg et al., "A Taxonomy of Obfuscating Transformations", *Department of Computer Science*, Technical Report # 148, pp. 1-36.

Bashar, et al., "Low-Threat Security Patches and Tools", *Purdue University Department of Computer Science*.

Birgit Pfitzmann, "Information Hiding Terminology" *Proc. Information Hiding, Workshop*, pp. 1-4.

* cited by examiner

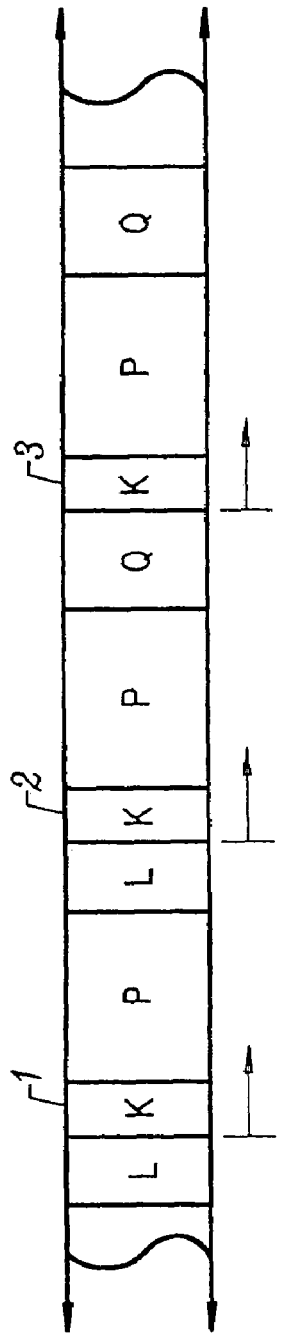

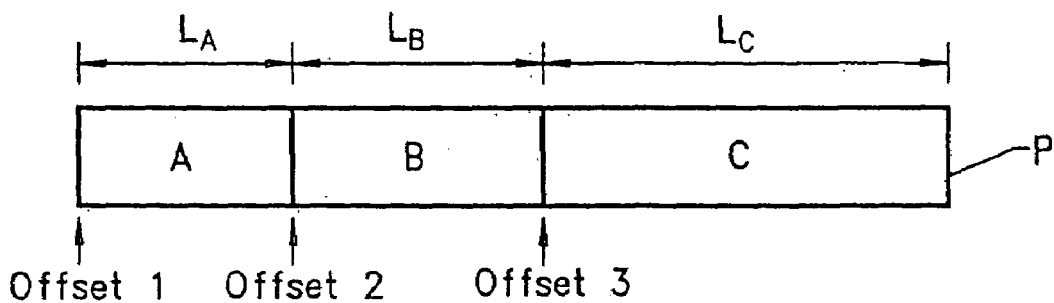
*FIG. 9G*
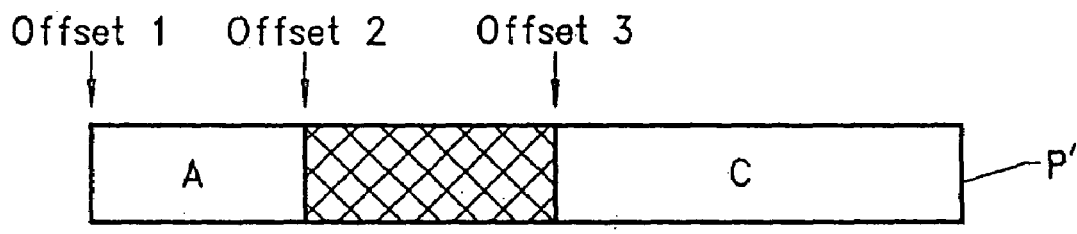
| Segment  | Source    | Length |
|----------|-----------|--------|
| Offset 1 | Off 1, P  | $L_A$  |
| Offset 2 | 0's       | $L_B$  |
| Offset 3 | Off 3, P  | $L_C$  |
*FIG. 9H*
| Segment  | Source       | Length |
|----------|--------------|--------|
| Offset 1 | Offset 1, P  | $L_A$  |
| Offset 2 | Source Fct   | $L_B$  |
| Offset 3 | Offset 3, P  | $L_C$  |
*FIG. 9I*

METHODS AND APPARATUS FOR SECURE DISTRIBUTION OF SOFTWARE

CROSS REFERENCE TO RELATED APPLICATION

This is a continuation-in-part of co-pending provisional patent application Ser. No. 60/131,769, filed Apr. 30, 1999.

BACKGROUND OF THE INVENTION

The present invention relates to secure methods for distributing software and data objects, as well as to access-controlled software and data objects, and computer systems which practice or utilize any of the foregoing.

Commercial distribution of software and data (such as media files and reports) by data communication is a very rapidly growing form of commerce. It is both efficient and convenient as compared to traditional distribution methods.

Distribution of software and data on a "Try and Buy" basis permits the user to run or "demo" the product before committing to buy it. This assumes that the software licensor or media distributor somehow exercises control over the use of the product at least until the recipient buys the right to use it. The widespread availability of data communication, especially via the Internet, also emphasizes the need for the software licensor and the media distributor to exercise control over their products.

One technique for controlling access to executables involves "wrapping" the executable to be controlled within a second program, termed a "wrapper". In effect, the executable to be controlled and the wrapper are joined into one executable, in which the wrapper is executed first and controls access to the wrapped executable.

However, conventional software protection systems based on wrapping are easily circumvented by class attacks which destroy the security otherwise afforded by a given type of wrapper. This is achieved through a modification of only a single part of the wrapper which is identical in all wrappers of that type. Generic unprotectors can easily be obtained via the Internet.

Another form of attack is the so-called "dump attack" in which the attacker waits for the wrapped application to be decompressed and/or decrypted in memory, and then dumps it to a hard disk in its original, unprotected state. Programs to carry out dump attacks also are easily obtained via the Internet.

A widely used security device injects new code into an existing executable in order to control access to the latter. When the executable is run, a specially-designed DLL executable is loaded for controlling access to the existing executable. The presumed "security" afforded by this scheme is circumvented by eliminating the call to the DLL or by modifying the DLL itself.

It has been proposed to package data objects with executables which carry out such control functions.

A dedicated user program is required to decrypt, decompress and format the data for display by a monitor and/or an audio reproduction device. Consequently, it is necessary to provide a different user program for each data format which may be encountered. For example, a different program is required to play an avi file than is used to display a bmp or JPEG file.

It would, therefore, be desirable to provide methods, software and computer systems which control access to data objects, but do not require different programs to display or present objects in various formats. It would also be desirable to provide methods, software and computer systems which control access to executables but which are not subject to class attacks or dump attacks.

SUMMARY OF THE INVENTION

As used in this application, the following terms shall have the indicated meanings:

Software: includes both data and programming instructions.

Package: any software to be stored, accessed, loaded, assembled, prepared for transmission or received as a unit.

Object: any software to be run, utilized or displayed as a unit.

Feature: a "feature" of an object is any function, instruction, capability, or information included therein, or controlled or enabled thereby.

Computer System: includes a single computer or multiple cooperating computers, and includes one or more PC's, mainframes, digital processors, workstations, DSP's or a computer network or networks, or a computer internetwork.

Wrapping: joining one executable with another executable in a package, one of the executables (termed the "Wrapper") being executed first and controlling access to the other executable.

Watermark: includes information in software which either enables identification of an owner, licensee, distributes or another having rights in or an obligation in connection with the software, or enables identification of a version or copy of the software. Usually, but not necessarily, the watermark is imperceptible and preferably is difficult to remove from the software.

Padding Area: a space within a software object or package which does not contain required code or data.

In accordance with an aspect of the present invention, a method of securely distributing software with limited usage rights is provided. The method comprises: supplying software for distribution to a user, the software including an access control object for preventing at least some usage thereof on a computer system without the use of a first access control code; producing the first access control code based on selected information characteristic of the predetermined computer system; and supplying the first access control code to the predetermined computer system to enable the at least some usage of the software.

In accordance with another aspect of the present invention, an executable object is provided, comprising: a first code portion comprising first predetermined instructions; and a second code portion comprising loading instructions required for loading the first code portion in a memory of a computer system to be programmed thereby, the second code portion being operative to control the computer system to erase the loading instructions from memory upon loading the first code portion in memory.

In accordance with still another aspect of the invention, a software package is provided, comprising: a first executable object, and a wrapper for the first executable object, the wrapper being operative to erase predetermined software from the first executable object when it has been loaded in running format in memory.

In accordance with a further aspect of the present invention, a computer system is provided, comprising: a processor; a memory; an instruction input device; and an executable stored in the computer system, the executable having a first code portion comprising first predetermined instructions for execution by the processor, and a second code portion including loading instructions, the processor being operative upon receipt of a predetermined instruction from the instruction input device to load the second code portion in the memory, the processor being operative under the control of the loading instructions to load the first code portion in the memory and operative under the control of the second code portion to erase the loading instructions from the memory upon loading the first code portion in memory.

In accordance with yet another aspect of the present invention, a software package comprises: a first object providing a first set of a plurality of features; a second object providing a second set of a plurality of features including some, but less than all, of the features included in the first set; and an access control portion affording selective access to the first software object and/or the second software object.

In accordance with still another aspect of the present invention, a software package is provided, comprising: a first executable object, and a wrapper for the first executable object, the first executable object being operative, while running, to access a feature of the wrapper; the wrapper being operative to supply the feature to the first executable object when the feature is accessed thereby.

In accordance with yet another aspect of the invention, a software package is provided, comprising: a first executable object, and a wrapper for the first executable object, the first executable object being operative, while running, to access a feature of the wrapper; the wrapper being operative to supply the feature to the first executable object when the feature is accessed thereby.

In accordance with yet another aspect of the invention, a software package is provided comprising: a first executable object, and a wrapper for the first executable object, the first executable object being operative to call a predetermined feature external thereto; the wrapper being operative upon a call of the predetermined feature by the first executable object to transfer program execution control to a predetermined address within the wrapper to control access by the first executable object to the predetermined feature.

In accordance with a still further aspect of the present invention, a computer system is provided, comprising: a processor; a memory; an instruction input device; and a software package stored in the computer system, the software package having a first object providing a first set of a plurality of features, a second object providing a second set of a plurality of features including some, but less than all, of the features included in the first set, and an access control portion; the processor being operative to load the software package in the memory, the processor being further operative to request access to a selected one of the first and second objects in response to a predetermined instruction from the instruction input device, the access control portion being operative to selectively control access to the selected object.

In accordance with still another aspect of the present invention, a software package is provided, comprising: a first object providing a first set of a plurality of features, the first object being encrypted; and a second object providing a second set of a plurality of features including some, but less than all, of the features included in the first set, the second object being unencrypted.

In accordance with yet still another aspect of the present invention, a driver executable is provided, comprising: first code for accessing a requested file from a storage device; second code for detecting the presence of a predetermined identifier in the accessed file; and decryption code for decrypting at least a portion of the accessed file in response to detection of the identifier therein.

In accordance with a still further aspect of the invention, a software package is provided, comprising: a software object having a first set of features and a second set of features, the first set of features being encrypted and the second set of features being unencrypted; and a signature readable by a predetermined executable serving to control access to the encrypted first set of features.

In accordance with a yet still further aspect of the present invention, a computer system is provided. The computer system comprises: a processor; a memory; an instruction input device; a storage device storing a file; an operating system; a driver executable; and a device driver serving to control access to the storage device; the instruction input device being operative to input a first request for access to the file; the operating system serving to control the processor to direct a second request for the file to the driver executable in response to the first request for access; the driver executable being operative in response to the second request to control the processor to direct a third request for the file to the driver; the driver being operative in response to the third request to control the processor to read the file from the device to the memory and thereupon return control of the processor to the driver executable; the driver executable being operative upon return of control thereto to control the processor to examine the file in memory to detect the presence of a predetermined identifier in the file and to decrypt at least a portion of the file in response to detection of the predetermined identifier therein.

The foregoing, as well as further aspects of the invention and advantages thereof, will be apparent in the following detailed description of certain illustrative embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIG. 4A is a spectral diagram of a segment of an audio signal to be included as a data object in a package, while

FIG. 5A illustrates a data format for use in storing usage authorization information governing the use of various objects in a package, while FIGS. 5B and 5C are tables providing examples of the types of data included in such usage authorization information;

FIGS. 8A and 8B schematically illustrate a portion of an executable object and a portion of a code section, to be watermarked; FIGS. 8C and 8D schematically illustrate methods for watermarking executable objects and code sections of the type illustrated in FIGS. 8A and 8B;

FIGS. 9A through 9I are used to describe methods for compressing and encrypting software carried out in the method of FIG. 7;

FIG. 11B is a diagram of an executable notifier included in the package of FIG. 11A, while

DETAILED DESCRIPTION OF CERTAIN PREFERRED EMBODIMENTS

Figure 1:
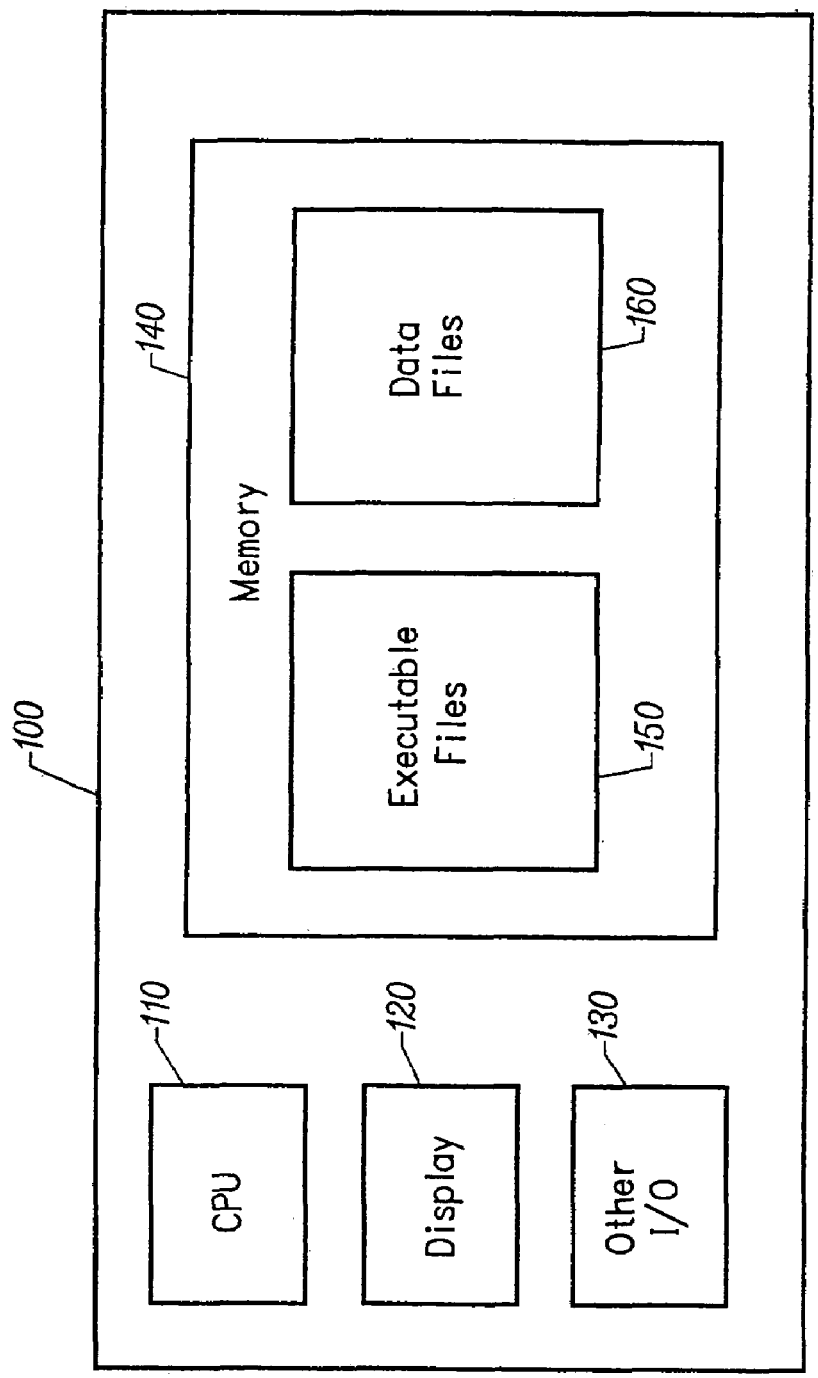
FIG. 1 is a block diagram of a computer system having a single CPU.

With reference to FIG. 1, a computer system 100 is illustrated schematically having one or more central processing units (CPU) or processors 110, a display 120, other input/output (I/O) apparatus 130 (such as a network or internet connection and a keyboard and/or mouse), and a memory 140 in which executable files 150 and data files 160 may be loaded for execution or use by processor 110. The computer system 100 also includes a non-volatile mass storage apparatus, such as a hard disk drive (not shown for purposes of simplicity and clarity).

Computer system 100 functions to produce software and to distribute the produced software to users, as well as to produce and distribute various other types of executables and data for controlling access to the produced software and carry out associated license purchasing transactions with users' computer systems. The manner in which system 100 carries out these functions will be apparent from the following discussion in connection with the associated drawings.

Figure 2:
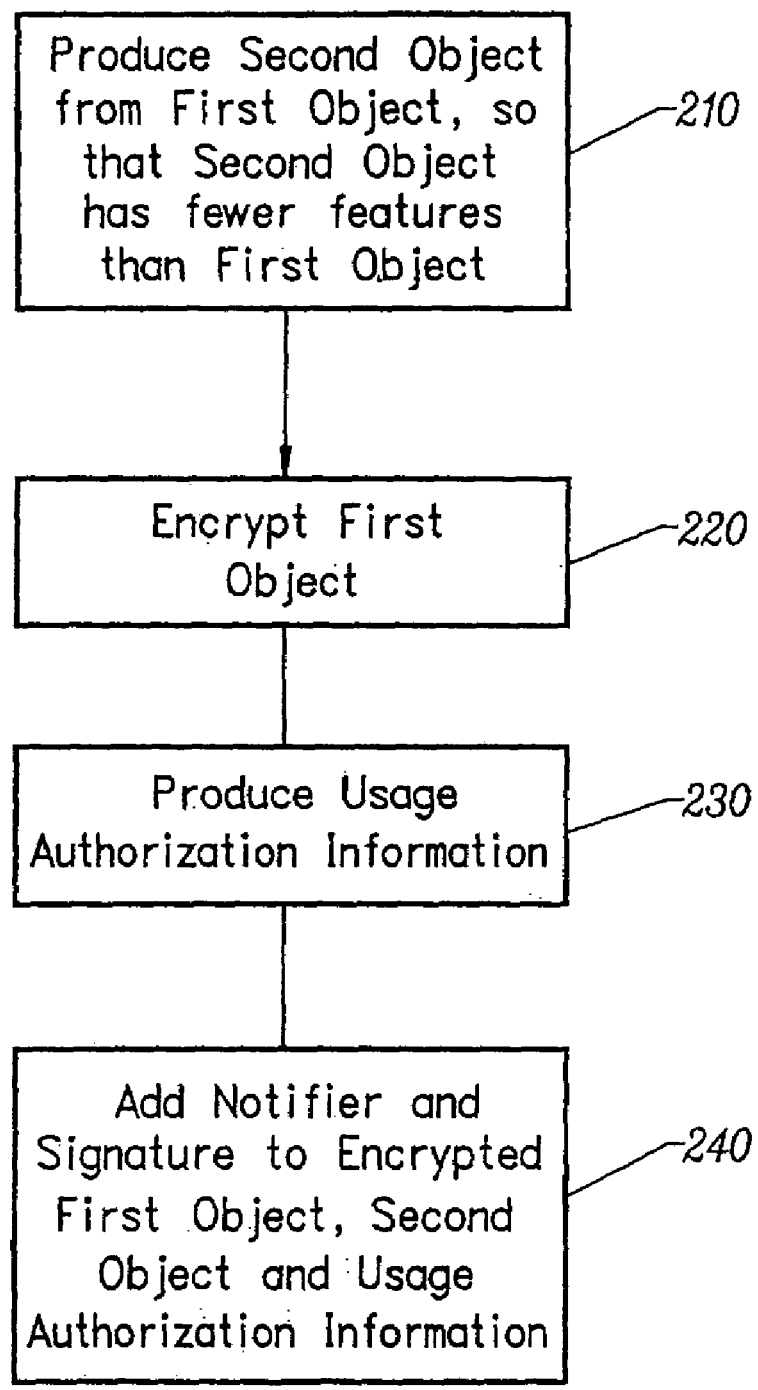
FIG. 2 is a flow diagram illustrating a method of producing software in the form of a package including a first object, a second object produced from the first object and usage authorization information governing use of the first and second objects.

FIG. 2 illustrates an exemplary method for producing a software package for distribution either on a record medium or by data communication, for example, via the world wide web or a dial-up service. The product thus generated includes multiple objects which either are data objects, such as media or multi-media objects, or are executable objects, such as games, applications or utilities. The method of FIG. 2 is especially useful for generating try-and-buy packages.

In the method of FIG. 2, a first object is used to produce one or more second objects in a step 210. In certain embodiments of this particular method, the one or more second objects are produced by removing features from the first object. In certain other embodiments, one or more first objects instead are produced from a second object by adding features to the second object.

Various embodiments of step 210 are illustrated in FIGS. 3A through 3L in which a first data object in the form of a digitized picture is used to produce multiple second objects having progressively less picture information.

Figure 3A:
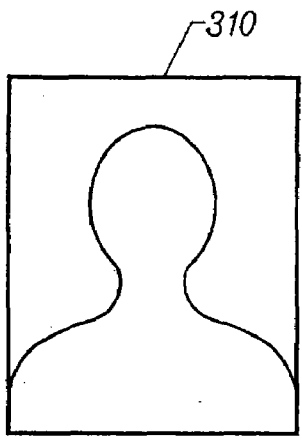
FIGS. 3A through 3C illustrate image objects to be included in a package and produced in multiple versions each including a respectively different amount of information, produced by varying the amounts of noise therein.
Figure 3B:
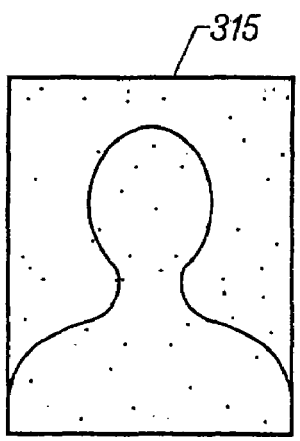
Figure 3C:
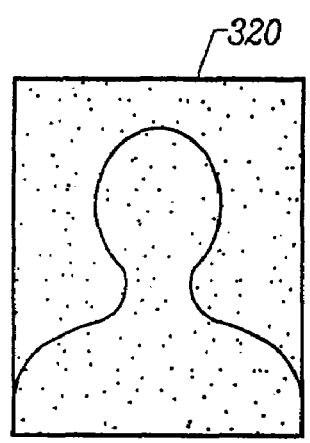

In a first embodiment, a first picture object 310 shown in FIG. 3A is used to produce a somewhat degraded version 316 as shown in FIG. 3B by the addition of noise to object 310. A further degraded version of object 310 is illustrated in FIG. 3C as picture object 320 which is produced either through the addition of noise to object 310 or the addition of further noise to object 315.

Figure 3D:
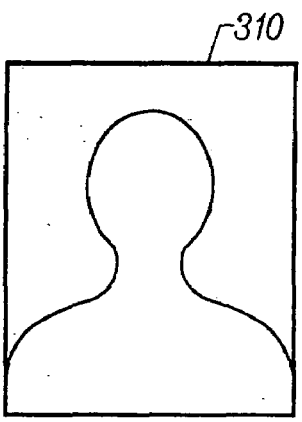
FIGS. 3D through 3F illustrate multiple versions of the same image object of FIG. 3A in which the amount of information in each version is varied by removing lines and/or portions of lines from certain versions.
Figure 3E:
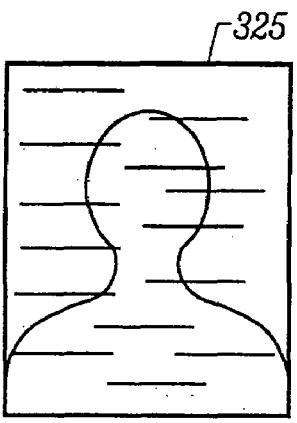
Figure 3F:
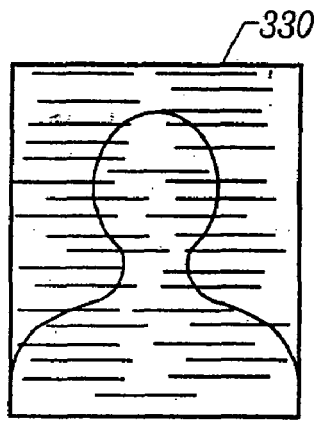

A second embodiment of step 210 is illustrated in FIGS. 3D through 3F. The first picture object 310 is shown again in FIG. 3D and is used to produce the moderately degraded version 325 as shown in FIG. 3E by removing lines or portions of lines from the data object 310. A further degraded version 330 of object 310 shown in FIG. 3F is produced by removing a relatively greater number of lines or portions of lines from object 310 or by removing still further lines from version 325. In still other embodiments the degraded versions are produced by removing multiple contiguous lines.

Figure 3G:
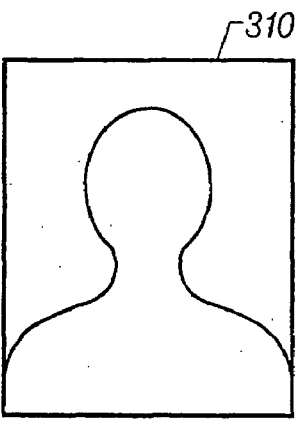
FIGS. 3G through 3I illustrate multiple versions of the image object of FIG. 3A in which the amount of information in each version is varied by filtering certain versions.
Figure 3H:
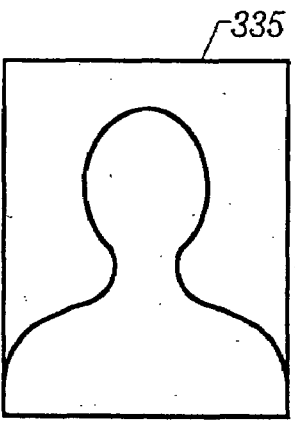
Figure 3I:
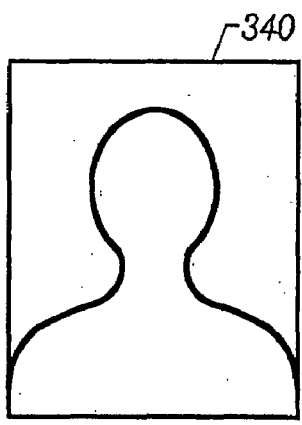

A further embodiment of step 210 is illustrated in FIGS. 3G through 3I in which the object 310 is subjected to low-pass filtering in order to remove fine details, such as the edges of objects. A moderately degraded version 335 as shown in FIG. 3H is produced by low-pass filtering of object 310 with a relatively high frequency cut-off point, while a further degraded version 340 shown in FIG. 3I is produced by low-pass filtering of object 310 with a relatively lower frequency cut-off point.

Figure 3J:
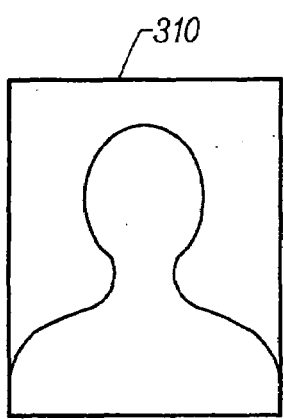
FIGS. 3J through 3L illustrate multiple versions of the image object of FIG. 3A in which the amount of information is varied by encrypting portions of certain versions.
Figure 3K:
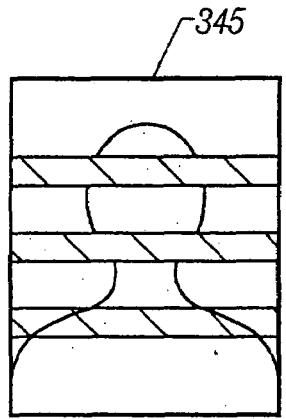
Figure 3L:
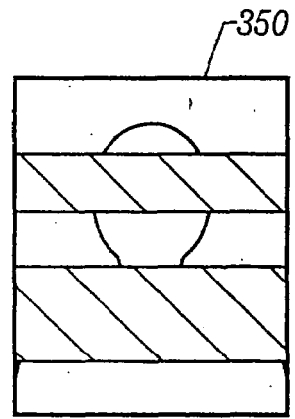

Yet another embodiment of the step 210 is illustrated in FIGS. 3J through 3L in which the object 310 is used to produce a somewhat degraded version 345 shown in FIG. 3K by encrypting groups of contiguous horizontal lines with a first encryption key. When the object is displayed without decryption, it will appear as version 345 as shown in FIG. 3K in which the encrypted portions are displayed as noise. Additional portions are encrypted to produce the still further degraded version 350 as shown in FIG. 3L, the additional portions being encrypted with a second key or with the same key used to encrypt the portions shown in FIG. 3K. Differently defined regions, such as blocks or vertical lines or regions, or else arbitrarily defined regions, may be selected for encryption.

In still other embodiments, either one, three or more degraded versions of a first picture object are produced.

In yet still further embodiments, further versions of a first picture object are produced by adding features thereto. For example, new elements can be added to the first picture object from other sources.

In other embodiments, the further versions are produced by substituting pixels having further information, such as finer detail or additional picture elements.

Figure 4A:
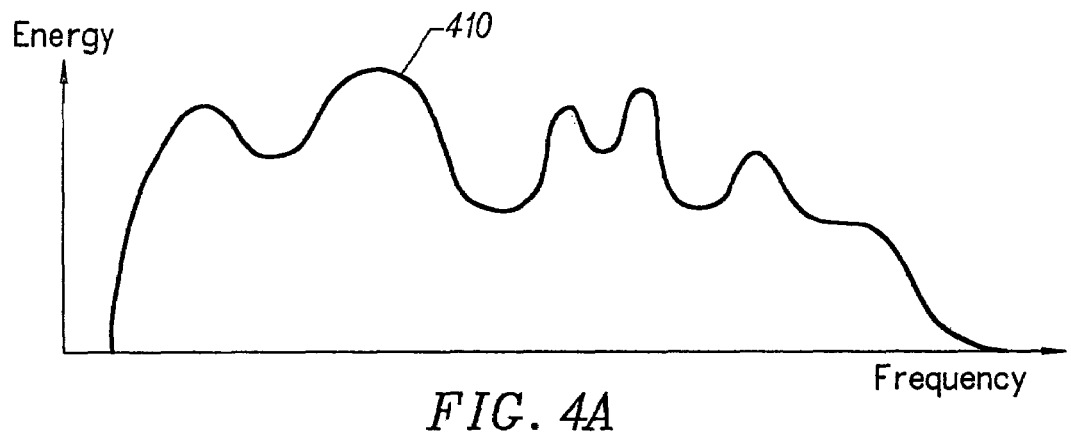
Figure 4B:
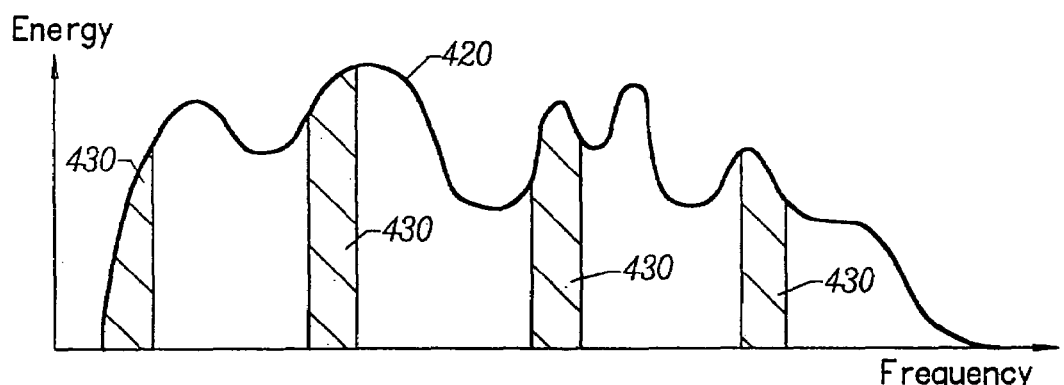
FIG. 4B is a spectral diagram of another version of the segment having relatively less information than the segment of FIG. 4A.

An embodiment of step 210 for producing multiple versions of an audio object is illustrated in FIGS. 4A and 4B. FIG. 4A provides an exemplary spectral energy distribution 410 for a segment of a first audio object. A modified or degraded version of the FIG. 4A segment is illustrated in the spectral energy distribution 420 of FIG. 4B. In FIG. 4B, the hatched-line frequency bands 430 represent portions of the energy spectrum which are removed, for example, by filtering, by removal of certain energy bins from an FFT transformed version of the segment, by removal of certain coefficients from a discrete cosine transformation of the segment, or otherwise. In still other embodiments, subbands of the audio signal in MP3 format are easily removed or encrypted to produce a degraded version thereof.

In the case of an executable object, step 210 is carried out in any of a number of ways. In one embodiment, the overall coding of a first executable object is modified to produce a modified executable object lacking one or more features of the first. This may be done by removing the routines necessary to perform the disenabled features or bypassing such routines. In another embodiment, only one section of the first executable object is modified. For example, executable objects often are provided with resource sections which are readily modified to enable or disable its functions.

In the method of FIG. 2, once the first and second objects have been prepared/obtained, the first object is encrypted to provide one means of controlling access thereto. In a try-and-buy transaction, as will be seen in greater detail below, the user is permitted free access to the second object having fewer than all of the features he needs, in order to assess his interest in acquiring rights to the first object which has all of the features he requires. Encryption is a relatively strong protection. The encryption step 220 is carried out so that a unique key or decryption executable is required to decrypt the first object. The key or decryption executable is produced by a server using selected information characteristic of the user's computer system, so that in order to decrypt the first object, both the key and decryption executable as well as the selected information are required. This key or decryption executable is stored in the system 100 and is not included in the package produced in the method of FIG. 2. Rather, once the user has purchased the right to use the first object, the system 100 transmits the key or executable to the user's system which stores the key or executable in a package other than that of the first object.

Figures 5A, 5B, 5C:
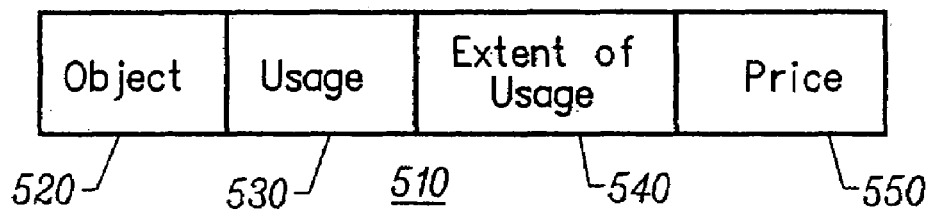

In Step 230 of the FIG. 2 method, data specifying permitted uses for each object and their price, if any, are produced and assembled according to each object. That is, for each object included in the package (or external to the package and referenced thereby) and for each permitted user thereof, a record 510 such as that illustrated in FIG. 5A is produced or accessed from storage in the system 100.

In a first field 520 of the record 510, data is provided identifying the object to which the record pertains. In a second field 530, the particular usage of the object for which the record is provided is identified. Examples of various usage types which can be identified in field 530 are listed in the table of FIG. 5B.

A third field 540 of the record 510 specifies the extent of the permitted usage for the price specified in a fourth field 550 of the record 510. As indicated in the left-hand column of the table provided in FIG. 5C, the extent of usage may be expressed in various ways, for example, by duration of use or numbers of usages. The price specified in the fourth field 550 corresponds to the authorized extent of usage, as can be seen from the table of FIG. 5C. For example, if the extent of authorized usage is N times, the price may represent a specified amount of money for each time or for a number of times.

In step 240 of FIG. 2, the first and second objects, and the usage authorization information are assembled in a package with a notifier section and, in packages having data objects, a signature. An exemplary structure for the package thus produced is illustrated in FIG. 6, wherein the notifier, indicated as element 610 is arranged as the first section of the package.

The notifier 610 can take the form of one or more data objects or an executable object, depending on the type of package. Where the package contains data objects in the form of media objects such as digital images, video data or audio data produced in a standard format, the notifier includes at least one unencrypted and uncompressed image to be displayed to the user, as needed. As will be explained in greater detail below, packages having data objects in standard formats preferably are accessed in the user's system by means of a driver executable in accordance with one aspect of the present invention. The first (or only) image stored in the notifier provides a message to the user that he needs to download the driver executable in order to make use of the data objects in the package. The notifier can also include a version of an object in the package having less information than such object, but which is unencrypted and readily displayed by the user's system. Once the driver executable has been downloaded and installed, it presents a dialog box to the user indicating the available objects, their authorized usages and the prices of each.

Figure 6:
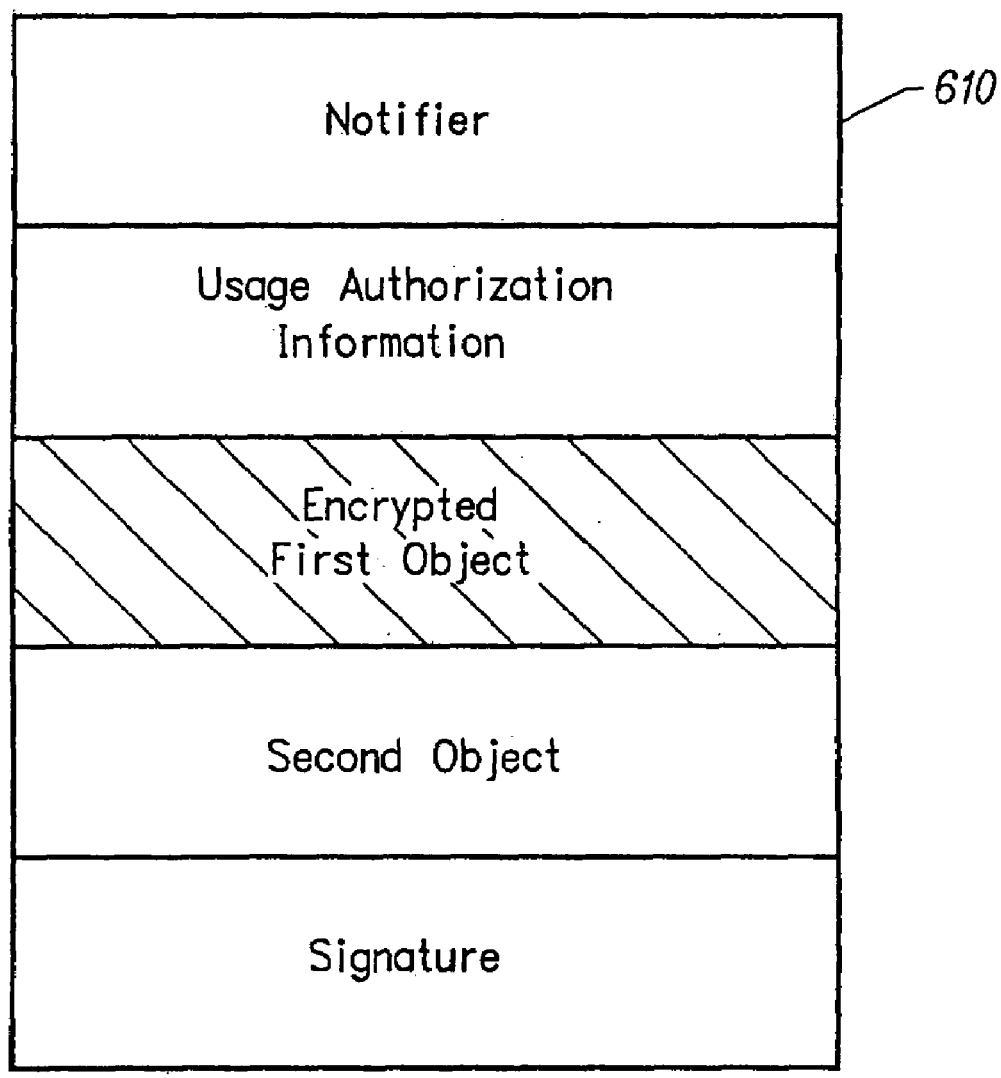
FIG. 6 is a diagram illustrating a package produced according to the method of FIG. 2 wherein a first object whose use is restricted is encrypted.

The driver executable is able to detect the type of accessed package as one including data objects requiring access control by the driver executable based on the package's signature which, in the embodiment of FIG. 6, is appended at the end of the package. Where the driver executable detects that the accessed package has no recognizable signature or instead includes executable objects, it simply passes such packages on to the operating system without exercising any form of access control.

Packages including executable objects have notifiers including executables which serve both to control access to the executable objects in the package and to display necessary images to the user. These functions of the executable notifiers will be described in greater detail below. Since the driver executable is only required for accessing packages having data objects, there is no need to include a signature in a package having only executable objects.

Figure 7:
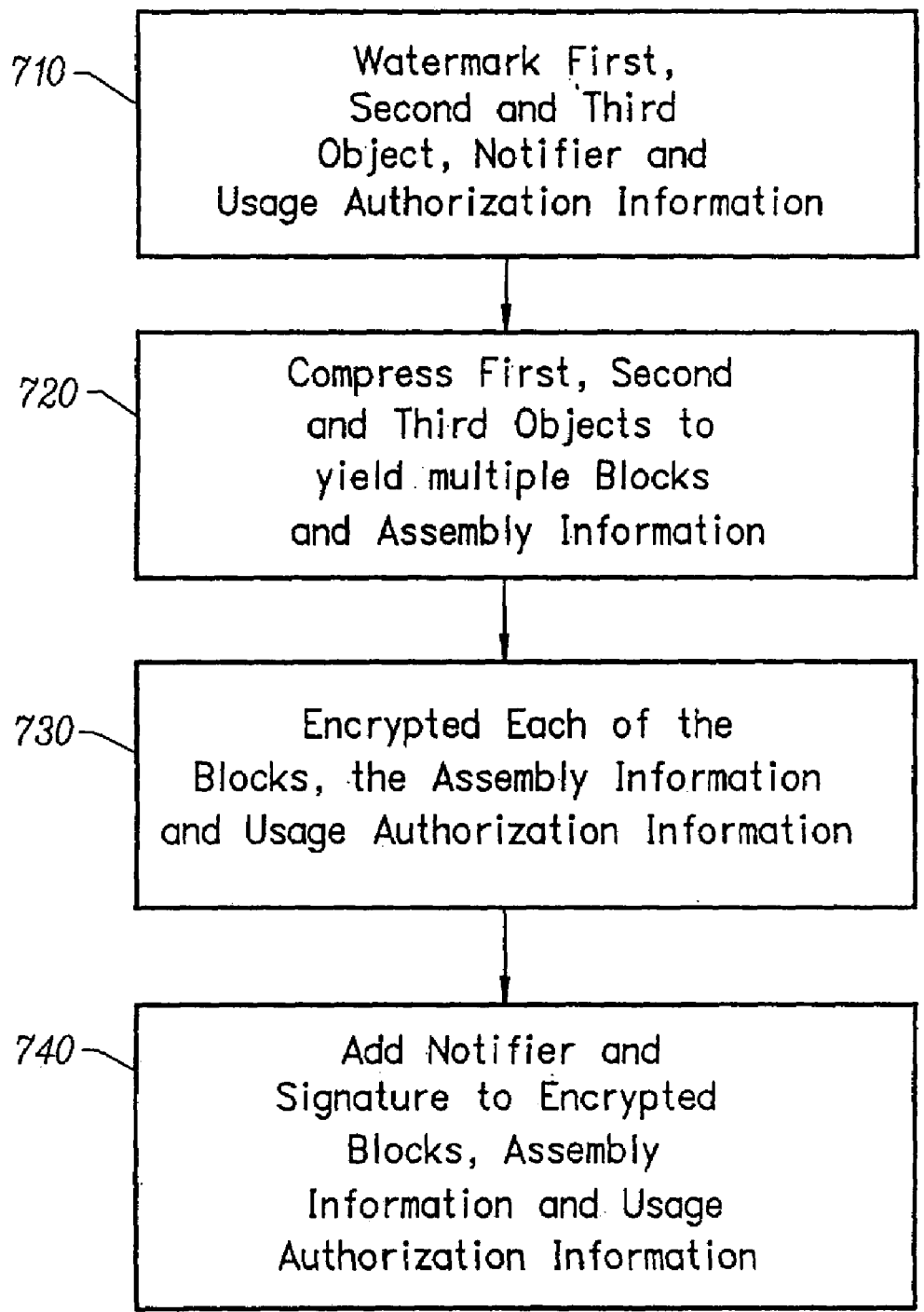
FIG. 7 is a flow diagram of another method for producing software in the form of a package, wherein multiple objects are watermarked, compressed and encrypted and usage authorization information is watermarked and encrypted.

FIG. 7 illustrates another method for producing a software package including data or executable objects. In a first step 710 of the FIG. 7 method, it is assumed that first, second and third objects, as well as an appropriate notifier and usage authorization information have been provided. In step 710, a watermark is placed in each of the foregoing objects, notifier and usage authorization information to provide a means of identifying the licensed user if any of these should be redistributed by him without authorization.

Data objects may be watermarked by any of a number of known methods which add data to the objects or modify the original data in order to embed the data of the watermark. However, watermarking of executable objects has, until now, been impractical, since any change to the code in the objects will interfere with the proper operation of the executable, and will likely render it inoperable. In addition, it is necessary for any such watermarking methodology for executable objects to enable the production of many variations in the watermark (at least one for each user) and, thus, in the anatomy of the executable, but wherein each variation of the executable is semantically equivalent to all other variations.

A further requirement is resistance to collusion attacks in which two or more dishonest purchasers combine their versions of the executable to derive one copy from which the watermark has been eliminated. To be considered resistant to such attacks, the number of different buyers whose individual revisions are all required to produce a watermark-free version or a version in which the watermark is useless, should be made impractically large.

In a further aspect of the present invention, watermarks are embedded in executable objects so that the watermarks are highly resistant to collusion attacks.

Advantageous watermarking techniques in accordance with certain features of the invention are illustrated in FIGS. 8A through 8D. In general, the method comprises: determining a location of at least one padding area in an executable object, and inserting a predetermined watermark in the at least one padding area. In certain embodiments, the watermark is encoded. A particularly advantageous form of encoding the watermark comprises including a plurality of software portions copied from the executable object or which mimic the same in the padding area to represent the encoded watermark.

Figure 8A:
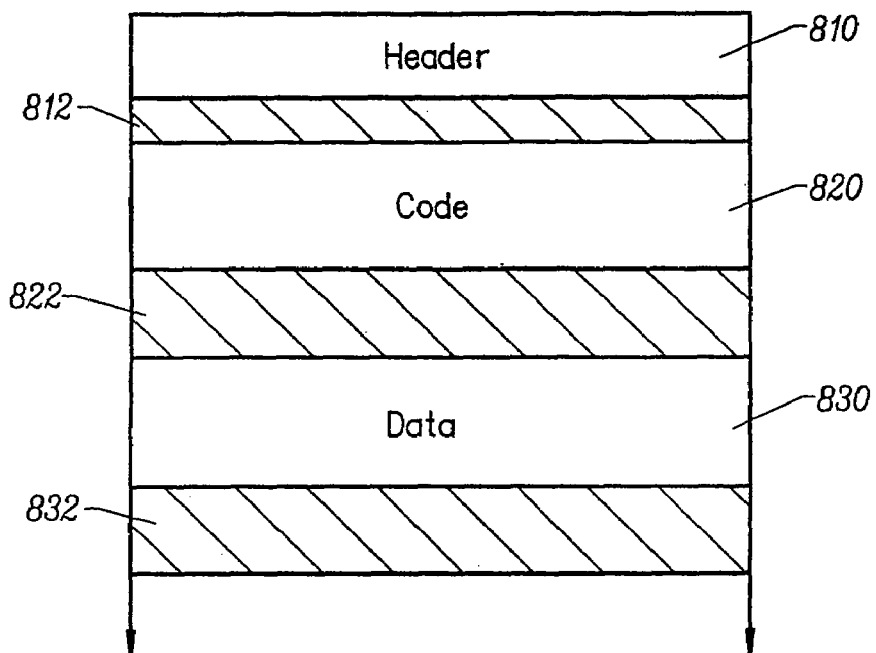
FIGS. 8A through 8D are used to describe methods for watermarking software carried out in the method of FIG. 7.
Figure 8B:
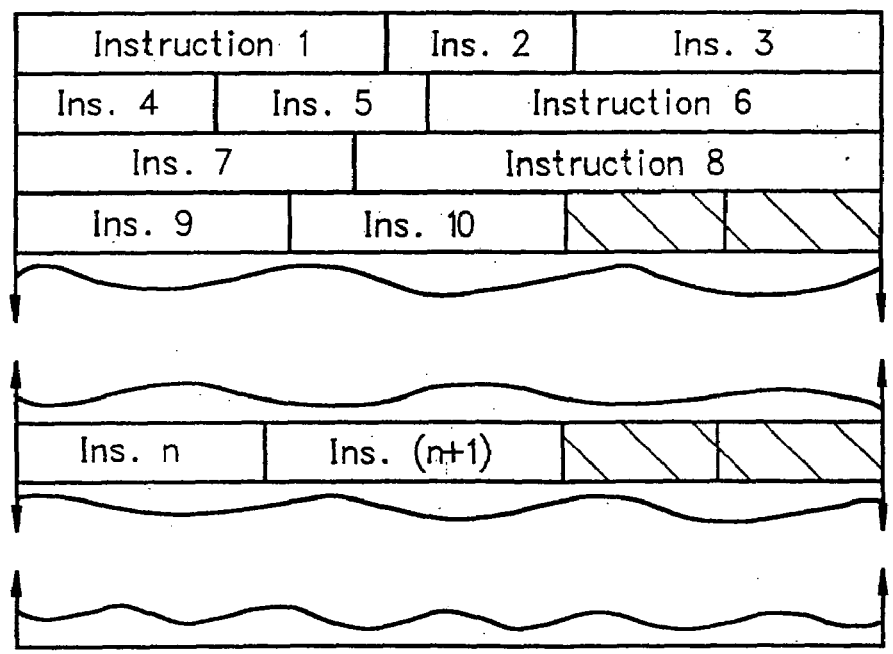

Example of padding areas are provided with reference to FIGS. 8A and 8B. FIG. 8A schematically illustrates a portion of an executable object in a storage medium, the object including a header 810, an executable code section 820 and a data section 830. The executable object of FIG. 8A is formatted so that each section begins at a predetermined boundary. For example, the formats of an executable in the Win 32 platform would align the beginnings of the sections 820 and 830 at a 4 Kbyte boundary. Similar alignment conventions have been devised for other software formats, such as the Common Object File Format (COFF) used in UNIX and the Portable Executable format (PE) which is an extension of the COFF utilized in Windows™ platforms. The technique of aligning the beginning of each section at a predetermined boundary is convenient for programming purposes.

As a result, padding areas 812, 822 and 832 are formed between the ends of the sections 810, 820 and 830, respectively, and the following boundaries.

The padding areas either contain code or data which is unimportant or are simply empty.

Padding areas also exist within sections. With reference to FIG. 8B, a schematic diagram of a code section is illustrated having instructions 1, 2, 3, . . . , n, (n+1), . . . .

In this example padding areas are located after instruction 10 as well as after instruction (n+1). Such padding areas may be produced, for example, by a compiler which is designed so that each routine or calling point is arranged according to cache-line size. Codes designed to run on Intel™ processors include sequences of opcodes 0x90 (NOP) in these padding areas, so that it is relatively easy to locate such areas.

There are a number of ways to include watermarks in the padding areas as shown in FIGS. 8A and 8B. In certain embodiments, the watermark data is inserted in the padding areas in an unencoded form. Less knowledgeable users and licensees are not likely to take steps to locate and remove such watermarks. However, in more secure embodiments, the watermark is generated as a random number or selected as a pseudorandom number so that it is not easily recognized in order to remove or alter it.

However, padding areas associated with executable code sections or routines normally are filled with code which is not to be executed but rather serves only as filler. To substitute a random number for such codes would likely arouse suspicion by a would-be software pirate. Accordingly, in particularly advantageous embodiments, the watermark is encoded in software which mimics software present in the object before the watermark is inserted. An efficient way to carry out this method is to copy portions of the preexisting software (code or data) to represent the watermark. In certain embodiments the copied code is modified to encode the watermark. Preferably, however, the copied portions are unmodified, but rather are selected to replace the existing contents of the padding area in a sequence representing the watermark. This is carried out in certain embodiments by selecting the copied portions according to their parities, so that a predetermined watermark can be recovered from the watermarked object simply by calculating the parities of the objects' contents until a known random or psuedo-random number constituting a predetermined watermark, is found.

Figure 8C:
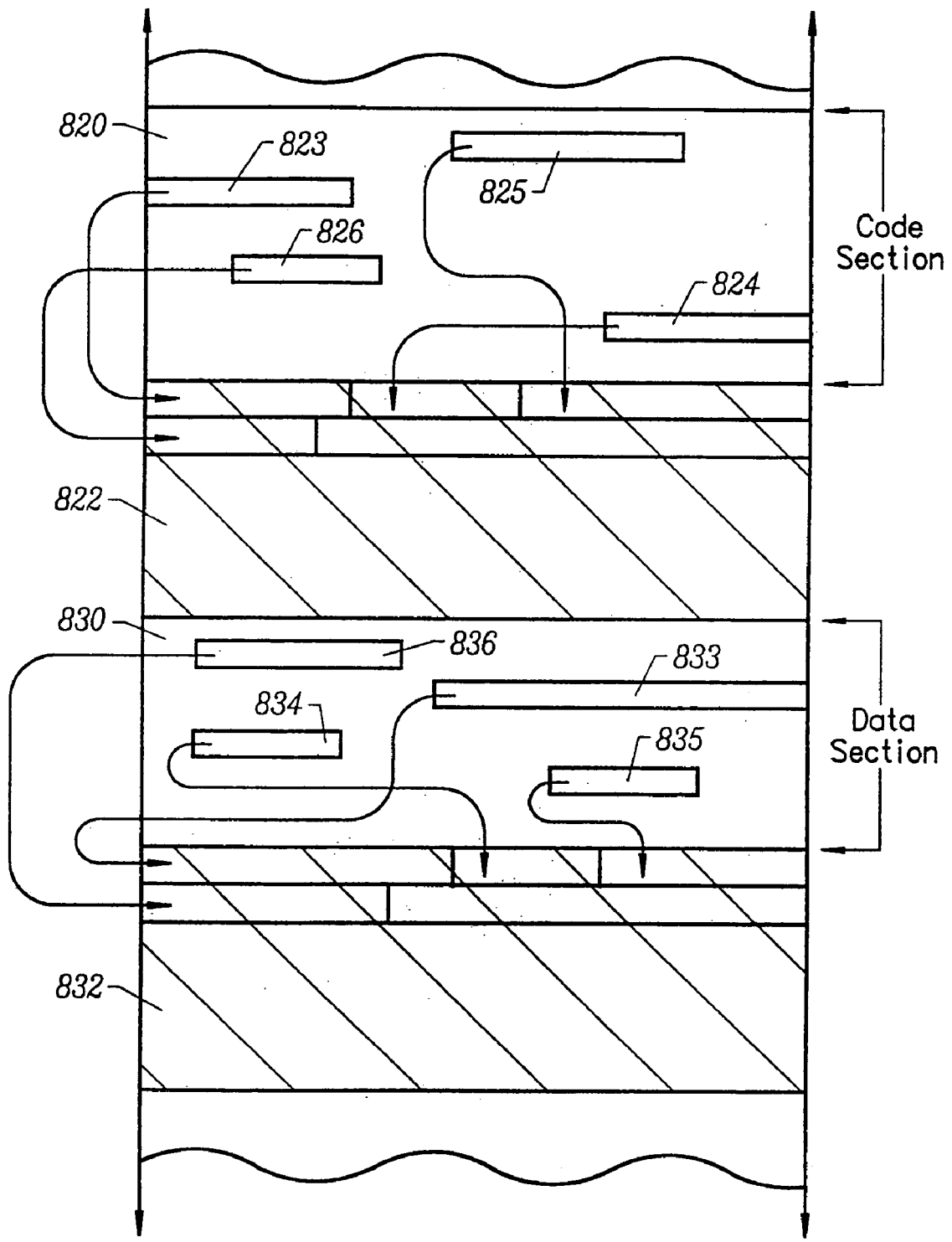
Figure 8D:
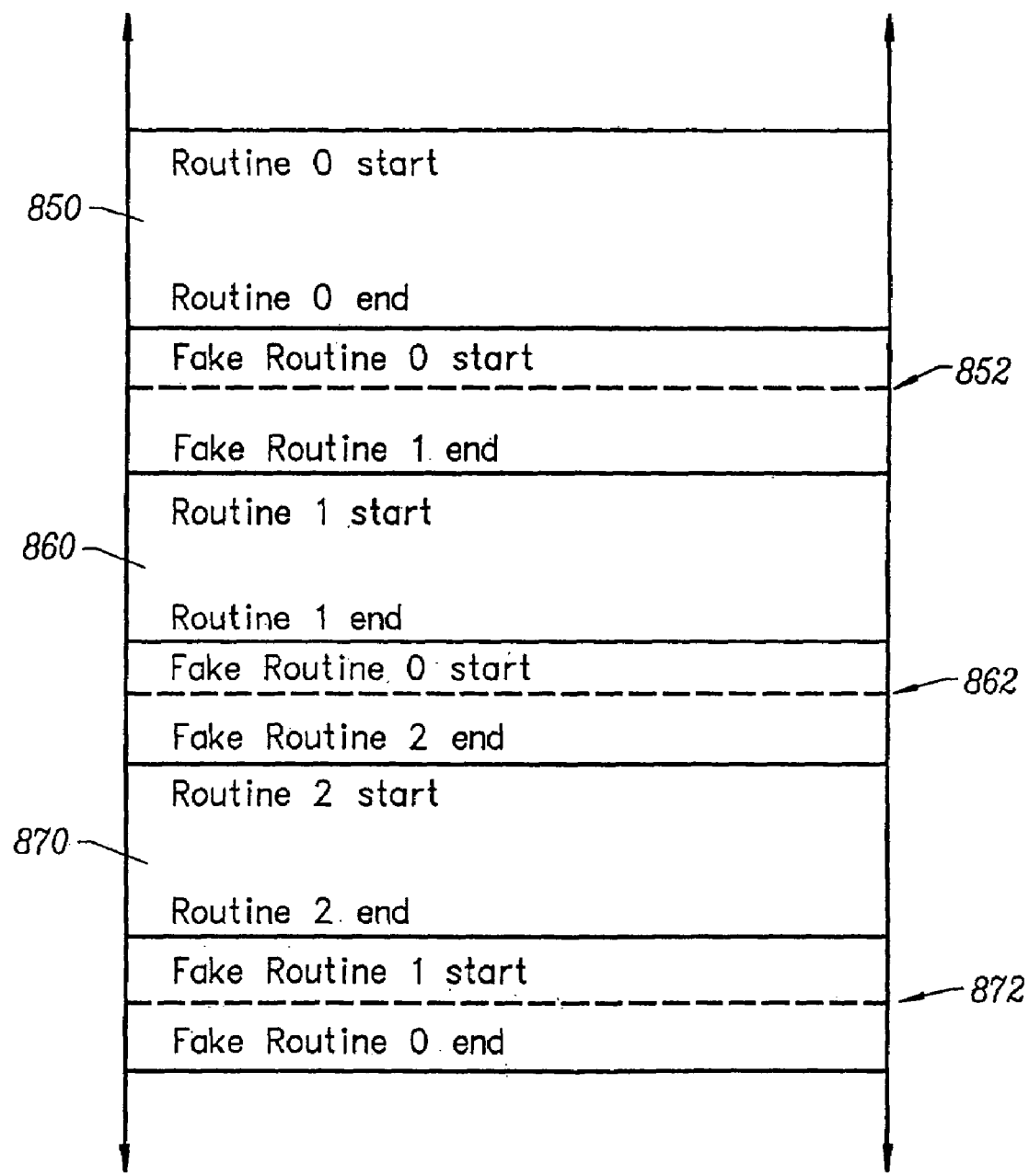

Examples of this encoding technique are illustrated in FIGS. 8C and 8D. FIG. 8C illustrates a technique for inserting watermarks in the padding areas 822 and 832 in the executable of FIG. 8A. Once the padding areas 822 and 832 have been located, their contents are substituted with software from the adjacent segments 820 and 832 to encode the watermark. In order to encode the watermark in padding area 822, the parities of various code blocks from the code section 820 are determined. Then the blocks are inserted in the padding area 822 based on their parities, so that when the parities of these blocks are later determined, they reveal the watermark, preferably a random-generated or pseudorandom number.

As an example, if the watermark to be inserted in area 822 is 1011, a block 823 is selected having a parity of "1" and is inserted in area 822. Then a block 824 having a parity of "0" is inserted in the area 822, followed in turn by blocks 825 and 826 having parities "1", and "1", respectively. Similarly, blocks 833, 834, 835 and 836 are inserted in area 832 to continue the watermark.

FIG. 8D provides an example of a method for encoding a watermark in the padding areas between routines in a code section of the type illustrated in FIG. 8B. Routines Ø, 1 and 2, also identified by reference numerals 850, 860 and 870, are separated by padding areas 852, 862 and 872. The watermark is inserted in the identified padding areas 852, 862 and 872 by copying portion of the sections, 850, 860 and 870 and inserting these in the padding areas. In the example of FIG. 8D, an initial portion of routine Ø is inserted in a first portion of padding area 852 and a concluding portion of routine 1 is inserted in a final portion of padding area 852. Similar selections and insertions are made in padding areas 862 and 872. In this example, the watermark is encoded in the selection of the portions of the routines inserted in the various padding areas.

Various other encoding techniques are available. In other embodiments, NOP opcodes are replaced by opcodes having the same effect, just in case the NOP's are actually executed. For example, opcodes such as [mov a1, a1], [mov c1, c1] [mov ah, ah] and [fnop] have the same effect as an NOP opcode and may be substituted therefor in order to encode a watermark.

In still other embodiments, the lengths of the blocks and/or fake routines are selected to encode all or part of the watermark.

In a subsequent step 720 of the method as illustrated in FIG. 7, the first, second and third objects are compressed in accordance with still another aspect of the present invention. In a third step 730 of the method as shown in FIG. 7, each of the blocks and assembly information representing the compressed first, second and third objects, as well as the Usage Authorization Information is encrypted. Preferably each is encrypted using a respective, unique key. The keys are not included in the resulting software package, but are retained to be distributed subsequently to authorized users.

Figure 9A:
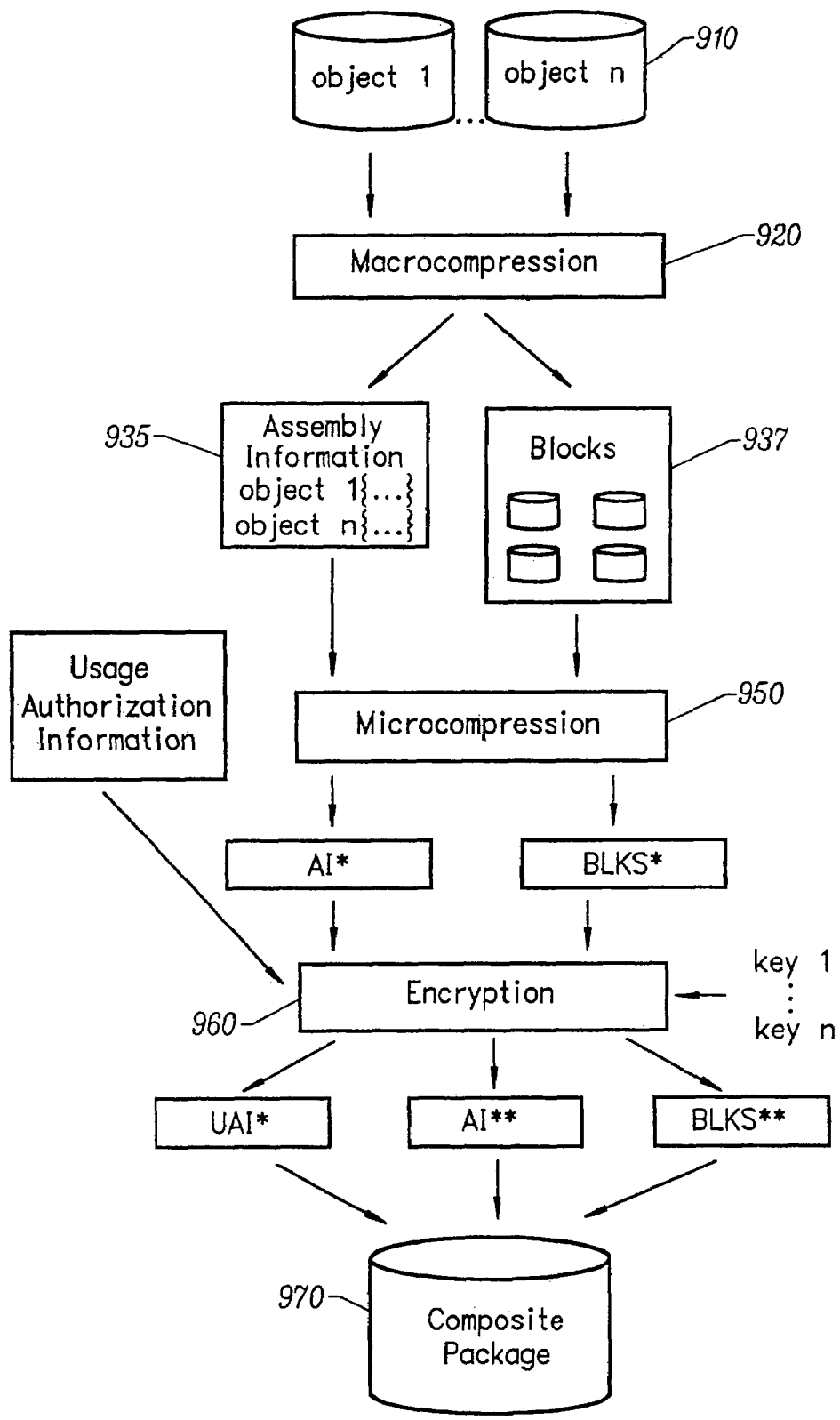

The inventive compression technique carried out in step 720 of FIG. 7, as well as the encryption step 730 thereof, are illustrated in greater detail in FIG. 9A. As shown therein, software objects 1 through n, identified by 910, which may take the form of separate software packages, are subject to an inventive macrocompression method 920 to convert the objects 1–n into one or more blocks 937 and assembly information objects 935, one for each object 1–n, each indicating how to reconstruct the various strings of the respective one of the objects 1–n from the one or more blocks 937. In summary, the macrocompression method 920, (1) produces matches of reference strings within the software objects 910 with comparison strings therein, the reference strings and the comparison strings having a predetermined minimum length, each comparison string within the same package as a matching reference string being separated therefrom by a predetermined minimum distance within the package, (2) expands the sizes of matching strings by including adjacent, matching software therein, and (3) forms compressed software objects comprising at least one software block corresponding to a selected one of the expanded, matching strings and assembly information indicating how to reconstruct others of the matching strings from the at least one software block. In certain embodiments, the software objects 910 comprise data. In other embodiments the software objects 910 comprise executables. While FIG. 9A shows multiple objects 1–n, the macrocompression method 920 also serves to compress a single object in certain embodiments.

Figure 9B:
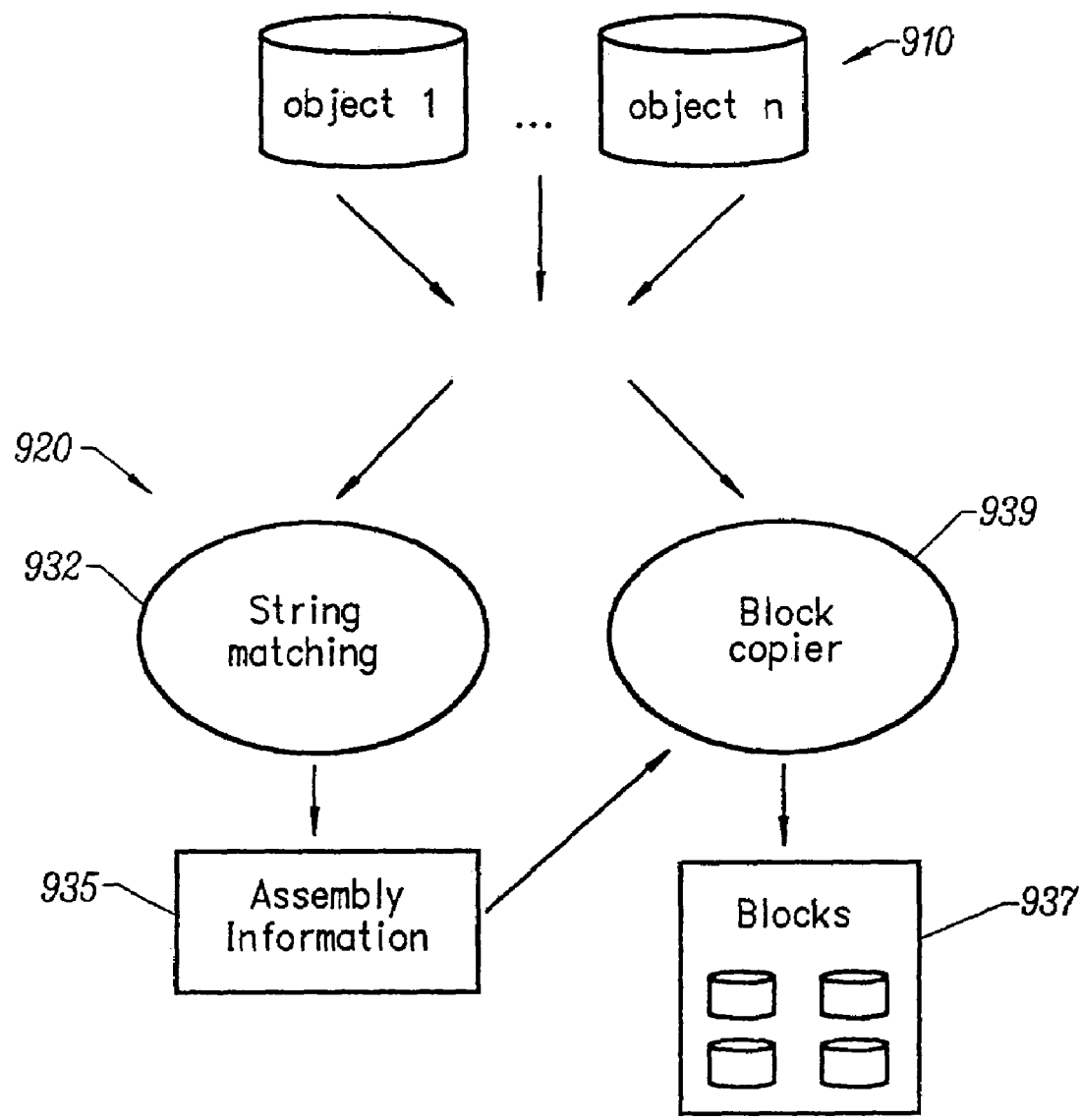

The macrocompression method 920 is illustrated in greater detail in FIG. 9B. String matching is carried out on the contents of the 1 through n objects 910, as indicated in a step 932. In certain embodiments, the string matching step is facilitated by producing a hash head table grouping possible string matches together according to their hashing functions.

A hashing function of a given string calculates a hashing value based on the values of the bytes in the string. In certain embodiments of the present invention, a minimum string length of n bytes is employed and a hashing function is selected to calculate a hashing value for each string of n bytes. In general, the hashing value for each string of n bytes in each of the objects to be compressed is carried out, although this is not essential. In the general case, the hashing function is carried out for each string in the object $[p_0, p_1, \ldots p_{n-1}]$, $[p_1, p_2, \ldots, p_n]$, $\ldots [p_i, p_{i+1} \ldots, p_{i+n-1}]$, etc. where $p_i$ represents a value of the i'th byte in the object. As the hashing value of each string having an offset j is determined, its offset j is added to a hash head table, indexed according to its hash value.

Figure 9C:
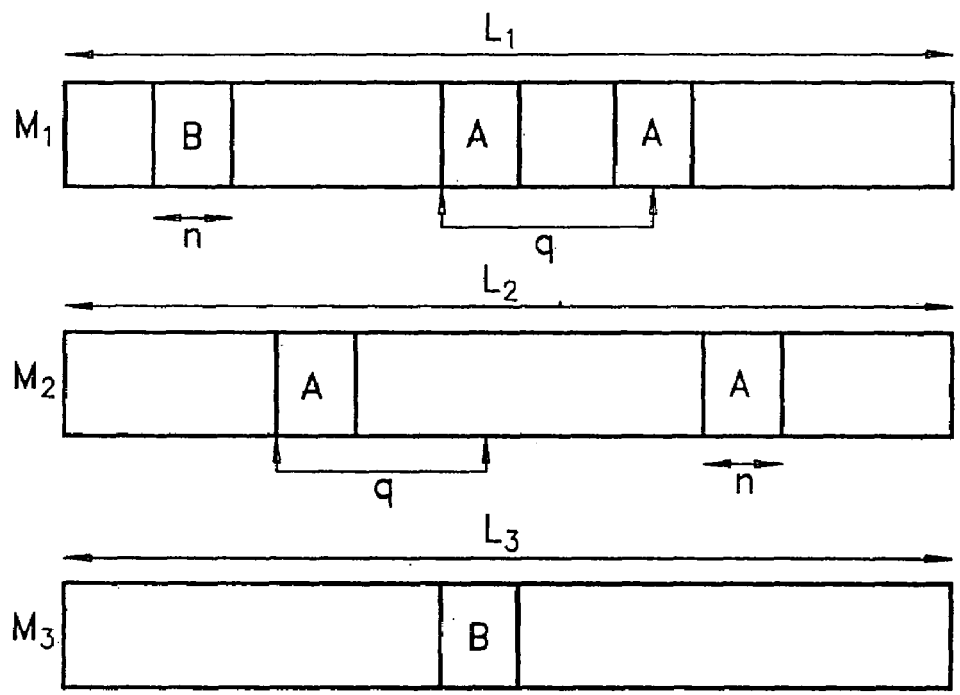
Figure 9C:
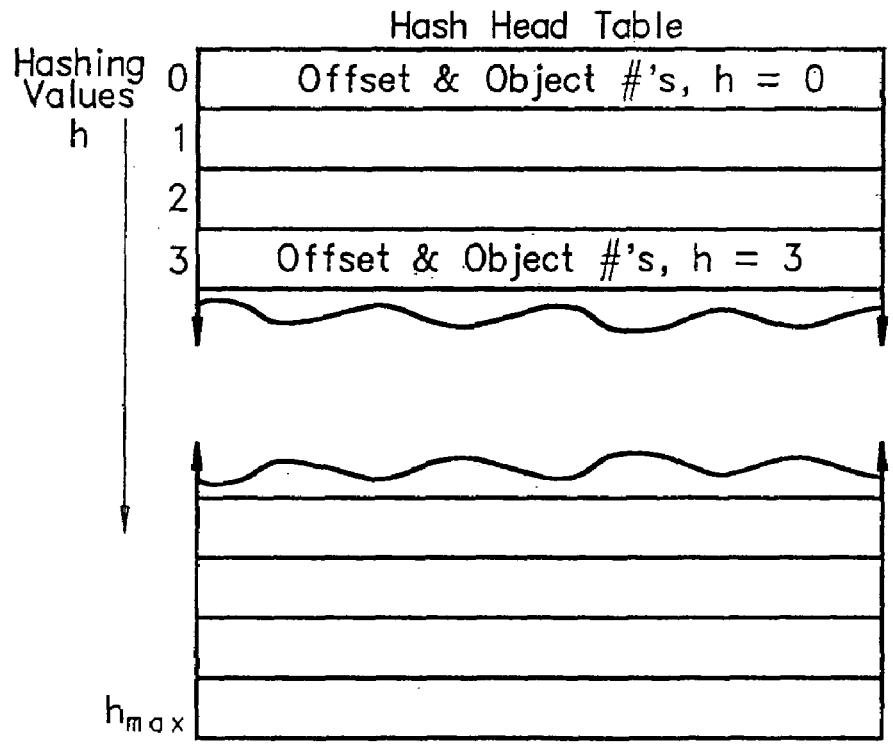

An exemplary hash head table is illustrated in FIG. 9C and stores data identifying each string of n bytes in three objects $M_1$, $M_2$, and $M_3$ indexed according to the hashing value of each string. As shown in FIG. 9C, all strings having a hashing value h equal to zero are identified by offset and object numbers in an initial record of the hash head table, and so on, until a final record is provided to identify those strings whose hashing value is a maximum among all hashing values in this case, $h_{max}$. It will be appreciated that the maximum possible number of different hashing values in this case will be $(L_1-n)+(L_2-n)+(L_3-n)$ which will occur in the event that each string yields a different hashing value. Accordingly, this is the maximum possible length of the hash head table for which memory space need be set aside in memory 140.

A particularly advantageous hashing function calculates the hashing value of each string of n bytes as a summation of their values:

$$h(j) = \sum_{i=j}^{j+n-1} p_i,$$

Wherein h(j) represents the hashing value of the jth string in the object and $p_i$ is the value of the i'th byte of the object. One advantage flows from the commutative property of this function. That is, the function is commutative since it may be carried out using the byte value $p_i$ in any arbitrary order. Consequently, in certain advantageous embodiments, once the hash value h(j) has been calculated as above for the string $(p_j, p_{j+1}, \ldots p_{j+n-1})$, the hashing value for the next string is determined using relatively fewer operations (and processing time) as follows:

$$H_{(j+1)} = h_{(j)} - p_j + p_{j+n}$$

Also, the contents of most objects yield hashing values which are clumped, that is, unevenly distributed over the range of hashing values. This tends to reduce the usefulness of the hashing function as a means of separating strings which do not match from those which possibly do match. Where the invention implements a hashing function of the type:

$$h(j) = \sum_{i=j}^{j+n-1} p_i,$$

in certain embodiments utilizing this function, clumping is reduced by increasing the range of hashing values. That is, where the hashing function is carried out in the form illustrated above for the strings of length n bytes in an object having a total of L bytes, the maximum number of different hashing values is (L−n). In the presently described embodiments, the hashing function is modified so that it takes the form:

$$h = K_1 h_1(\text{bytes } a) + K_2 h_2(\text{bytes } n-a),$$

wherein (bytes a) are the first (a) bytes within the string, so that a<n; (bytes n−a) represents the following (n−a) bytes within the same string; a selected one of $K_1$ and $K_2$ is equal to 1 and the other of $K_1$ and $K_2$ is an integer greater than 1; the function $h_1$ is calculated: $h_1 = \Sigma(\text{bytes } a)$; and the function $h_2$ is calculated: $h_2 = \Sigma(\text{bytes } n-a)$.

In a particularly advantageous form of this embodiment, memory space is conserved by assigning the value (255a+1) to the other of $K_1$ and $K_2$, so that the maximum value of $h_1$, which is (255a), immediately precedes the minimum non-zero value of $K_2$, which is (255a+1). As a consequence, there is no wasted memory space between these two possible hashing values.

Still other types of hashing functions may be employed in place of the above-described summation function. In particular, other commutative hashing functions are similarly advantageous. For example, an appropriate commutative hashing function h can take the form:

$$h(j)=p_j \times p_{j+1} \times \ldots \times p_{j+n-1},$$

or the form:

$$h(j)=p_j \oplus p_{j+1} \oplus \ldots \oplus p_{j+n-1},$$

Since these functions are commutative, they can also be implemented in a simplified fashion as $$H(j+1)=h(j)(inv\_op)p_j(op)\ P_{j+n},$$

where (op) represents a selected commutative operation (such as addition, multiplication or exclusive OR) and (inv_op) represents the inverse of such operation.

As noted above, the hash head table produces records containing possible matches. So, once the table is produced, the string matching process continues by searching for matches within each record of the table on the condition that, to qualify as an acceptable match, two matching strings within the same package (such as strings from the same file) must be separated by a predetermined minimum distance within the package. The following Table 1 provides an example of a possible sequence by byte values within a given package wherein each row of byte values is a continuation of the preceding row of values:

TABLE 1

| | Column | | | | | | | | |
|---|---|---|---|---|---|---|---|---|---|
| | 1 | 2 | 3 | 4 | 5 | 6 | 7 | 8 | 9 |
| Row 1 | 3 | 2 | 5 | 1 | 7 | 9 | 10 | 5 | 7 |
| Row 2 | 10 | 11 | 31 | 2 | 5 | 1 | 7 | 9 | 10 |
| Row 3 | 9 | 21 | 24 | 0 | 0 | 0 | 0 | $X_1$ | $X_2$ |
| ... | | | | | | | | | |
| Row k | $X_N$ | 2 | 5 | 1 | 7 | 9 | $Y_1$ | $Y_2$ | $X_3$ |

From Table 1 it will be seen that four different strings of five bytes each have the hashing value h(j)=24 where $$h(j) = \sum_{i=j}^{j+4} p_i,$$

namely, (a) the string (a) from row 1, column 2 to row 1, column 6 having the values (2, 5, 1, 7, 9), (b) the string (b) from row 2, column 4 to row 2, column 8 having the values (2, 5, 1, 7, 9), (c) the string (c) from row 3, column 3 to row 3, column 7 having the values (24, 0, 0, 0, 0), and the string (d) from row k, column 2 to row k, column 6 having the values (2, 5, 1, 7, 9). While strings (a) and (c) have the same hashing values, they clearly do not match. Also, since to qualify as an acceptable match, the matching strings must be separated at least by a minimum distance if within the same package, strings (a) and (b), while matching, will not qualify the minimum distance exceeds 11 bytes. Typically, the minimum distance will be substantially greater than 11 bytes in order to provide the ability to compress further through microcompression, as explained in greater detail below. If it is assumed that the matching strings (a) and (d) are separated at least by such minimum distance, therefore, strings (a) and (d) form a qualifying match.

An example of a search for matching strings in multiple packages is now provided with reference to FIG. 9C. Packages $M_1$, $M_2$ and $M_3$ are illustrated therein having two types of exemplary strings of length n bytes, strings A and B. Where matching strings are contained in different packages, as in the case of strings B in packages $M_1$ and $M_3$, there is no need to require a minimum distance between them, as they would not be matched in the subsequent microcompression process. However, if it is assumed that the minimum distance between strings is q bytes as shown in FIG. 9C, then the two strings A in $M_1$ will not form a qualifying match as they are offset by less than q bytes. However, the two strings A in $M_2$ will form a qualifying match as the strings of this pair are separated within package $M_2$ by more than q bytes.

Once all of the qualifying matches of a given type of string have been found, their identifiers are collected under a common group designation. When all of the qualifying matches of each type of string in the package or package being compressed, have been found and so grouped, the sizes of the matching strings are expanded by including adjacent matching bytes therein. An exemplary string expansion technique is explained in connection with FIG. 9D which is a schematic illustration of a portion of a package or object having various types of strings K, L, P and Q, in which the matching process has located three qualified matching strings 1, 2 and 3 of type K. In order to expand these strings in one embodiment, each of the strings 1, 2 and 3 is expanded to the right by one byte and then the various combinations of matching string pairs (1 and 2, 2 and 3, 1 and 3) are compared for a match. If a match is still found for a given pair, the strings of the matching pair are repeatedly expanded by one byte and compared until a match is no longer found. At that point the identity of the pair and its matching length is entered in a table of the various string pair combinations, as shown in FIG. 9E.

In other embodiments, the matching strings of each group instead are expanded to the left, while in still other embodiments the matching string are expanded in both directions.

Once the expanded matching pairs have been entered in the table of FIG. 9E, they are removed from the hash head table.

When all of the matching strings have been expanded as explained above, the software blocks and the assembly information constituting the compressed package or packages are produced in a step 935 of FIG. 9B. Preferably, representative ones of the largest expanded, matching strings are selected as the software blocks, represented schematically at 937 in FIG. 9B, and copied as indicated in step 939. Then the assembly information is produced as information referencing the remaining strings to all or a portion of each of the software blocks, as their contents correspond. This step is illustrated by the example of FIGS. 9D through 9F. As described above, in this example, the matches for each pair of strings (1, 2); (1, 3) and (2, 3) as seen in FIG. 9D were separately expanded to produce the data shown in the table of FIG. 9E. From FIG. 9E it will be seen that the largest expanded, matching strings are strings 2 and 3. In this example, string 2 is selected as a software block for reference in reproducing each of the expanded strings 1, 2 and 3, since the contents of each is either contained in or corresponds to the contents of expanded string 2. The assembly information necessary to reconstruct strings 1 2 and 3 is arranged in the table in FIG. 9F. For example, string 1 is identified by its offset in the original package or object and its contents are reproduced from string 2 (software block) as the source, based on the offset within string 2 at which its contents is located (the source offset) and the length of such contents within string 2. In this manner, relatively large blocks of data from the original, uncompressed package or object can be represented as only a few bytes within the assembly information in the compressed form thereof, resulting in substantial reductions in the amount of data required to represent the package or object when it has been compressed according to the macrocompression method of step 920.

Where it is desired to remove information from a given package, for example, in order to produce images such as those illustrated by FIGS. 3E and 3K, or a sound segment such as that shown in FIG. 4B, a technique as illustrated in FIGS. 9G and 9H is advantageous. In FIG. 9G, it is assumed that a segment B is to be removed from a package P and substituted with zero values throughout, or else by some other constant or by noise. As shown in FIG. 9G, the segment B is located at an offset 2 and has a length LB. Segment B is flanked by a segment A located at an offset 1 and a segment C located at an offset 3.

The desired result is illustrated in FIG. 9H wherein the segment B is replaced by zero-value data, represented by double cross-hatching. The resulting package P' is achieved by specifying the source for each of the three segments, as shown in the table T of FIG. 9H, wherein the source for the segment at offset 2 extending for a length $L_B$ is specified as the constant value zero, which thus replaces the original contents of segment B.

Once the new package P' has thus been specified, macrocompression is carried out only for the first and third segments at offsets 1 and 3. This is achieved preferably by constructing a hash head table only for the strings in the first and third segments A and C, and prohibiting the use of any strings in the second segment in producing the hash head table. Thereafter, both the macrocompressed segments at offsets 1 and 3 and the uncompressed segment at offset 2, may be compressed by microcompression as discussed below.

This technique is useful not only in producing degraded objects and packages, but also for preparing a partially compressed package or object having an uncompressed portion which is thus readily modified.

Returning to FIG. 9A, after the macrocompression method 920 has been carried out, the resulting blocks and assembly information are further compressed by microcompression, as indicated by step 950. As used herein, microcompression identifies a software compression technique which compares strings having a predetermined maximum size with other strings of the same size which are located no more than a predetermined distance or window from one another in the same package, in order to eliminate redundant strings. An example of a microcompression executable is the PK Zip™ utility. The result of microcompression is further compressed assembly information AI* and software blocks BLKS* as shown in FIG. 9A.

Preferably, the window used in the microcompression process is smaller than the minimum distance between qualified matching blocks in the macrocompression method of step 920. In this manner, different strings are compared in the two compression techniques, thus affording more effective compression. In accordance with another aspect of the invention, a method of compressing software in one or more packages comprises: producing first compressed software by matching strings selected so that matching strings within the same package are separated at least by a minimum predetermined distance within the package, and producing second compressed software by matching strings of the first compressed software within the same package and within a maximum predetermined distance of one another. Preferably, the minimum predetermined distance is greater than the maximum predetermined distance.

The further compressed assembly information AI* and software blocks BLKS*, along with the Usage Authorization Information, are then encrypted in a step 960 so that the Usage Authorization Information and the assembly information AI* for each object 1 through n, is encrypted using a respectively different encryption key. Preferably, each of the blocks BLKS* is also encrypted with a respectively different encryption key. As will be explained in greater detail below, each encryption key is produced based on information characteristic of the user's computer system, and so that decryption requires the use of both the encryption key and such characteristic information. This ensures that the encrypted information and software cannot be decrypted using a system other than the user's particular system.

In accordance with a further aspect of the invention, a method of encrypting software representing a plurality of compressed objects is provided. The software includes at least one software block and assembly information for each of the objects, the assembly information for each object enabling the reconstruction thereof from the at least one software block. The method comprises: encrypting each of the software blocks with an encryption key; and encrypting the assembly information for each object using a respectively different encryption key. Preferably, a respectively different encryption key is used to encrypt each of the software blocks.

The encrypted assembly information AI and the encrypted software blocks BLKS, together with the encrypted Usage Authorization Information, are formed into a single composite package 970.

In a final step 740 of the method as shown in FIG. 7, an appropriate notifier and signature (if necessary) are added to the encrypted blocks, assembly information and usage 20, authorization information to complete the software package.

Figure 10:
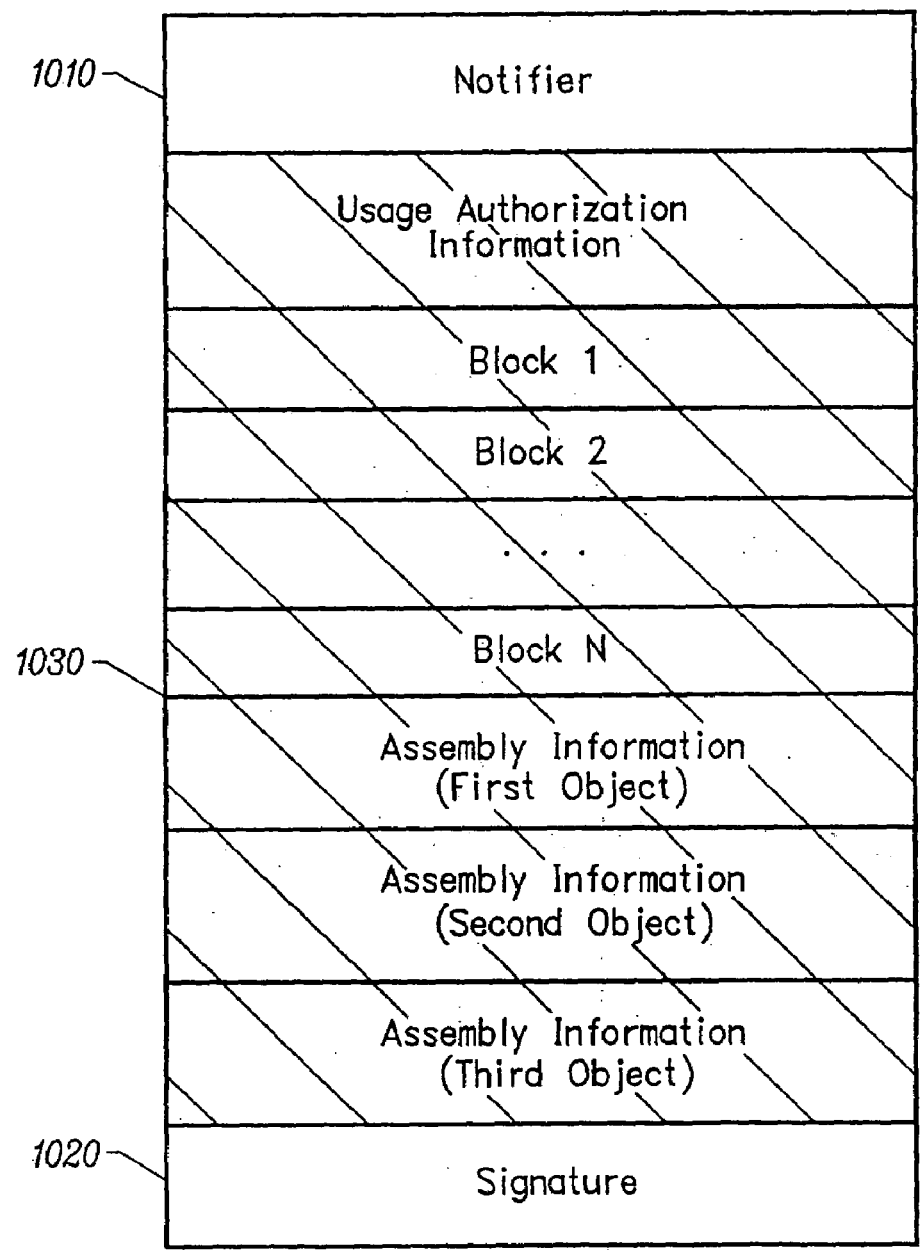
FIG. 10 is a diagram of software in the form of a package produced by the method of FIG. 7.

An advantageous format for the software package is illustrated in FIG. 10, wherein the notifier 1010 is placed at the head of the package. Where the package includes data objects, placing the notifier at the head of the package will result in the display of the correct image when the package is first accessed. Where the package includes executable objects, the first portion of the package may simply be a header indicating the entry point for an executable notifier located anywhere in the package. Packages including data objects have a signature 1020 appended thereto. Placing the signature at the end of the package enables the executable driver to readily locate the signature in order to determine if it is to exercise access control over data objects in the package as well as perform other functions, such as decryption and decompression of the data objects. Although the signature 1020 is shown appended at the end of the package, in the alternative, it may be located elsewhere, such as at the beginning of the package or after the notifier.

Between the notifier 1010 and the signature 1020, the encrypted sections 1030 (indicated by cross-hatching) are arranged in a predetermined order to be accessed by the driver executable or the executable notifier, as the case may be.

Figure 11A:
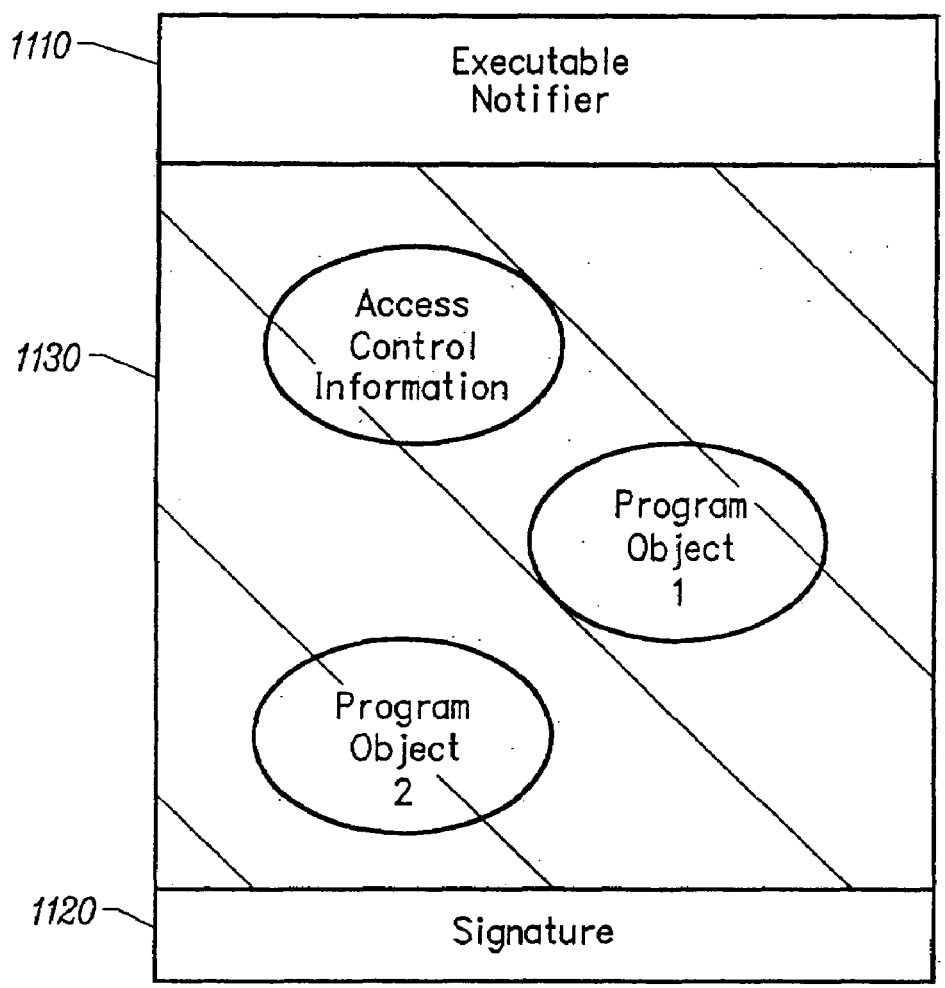
FIG. 11A is a diagram of software in the form of a package including first and second executable or program objects.
Figure 11B:
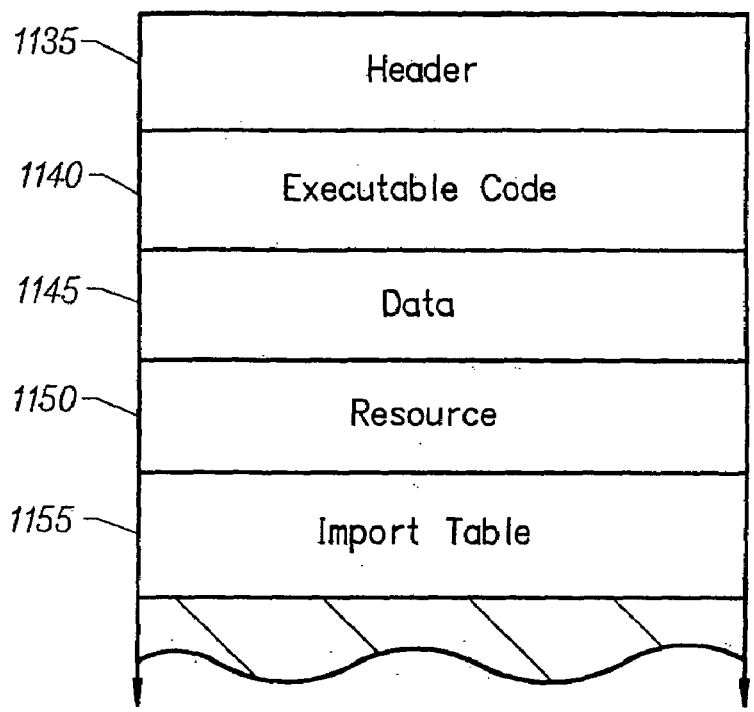
Figure 11C:
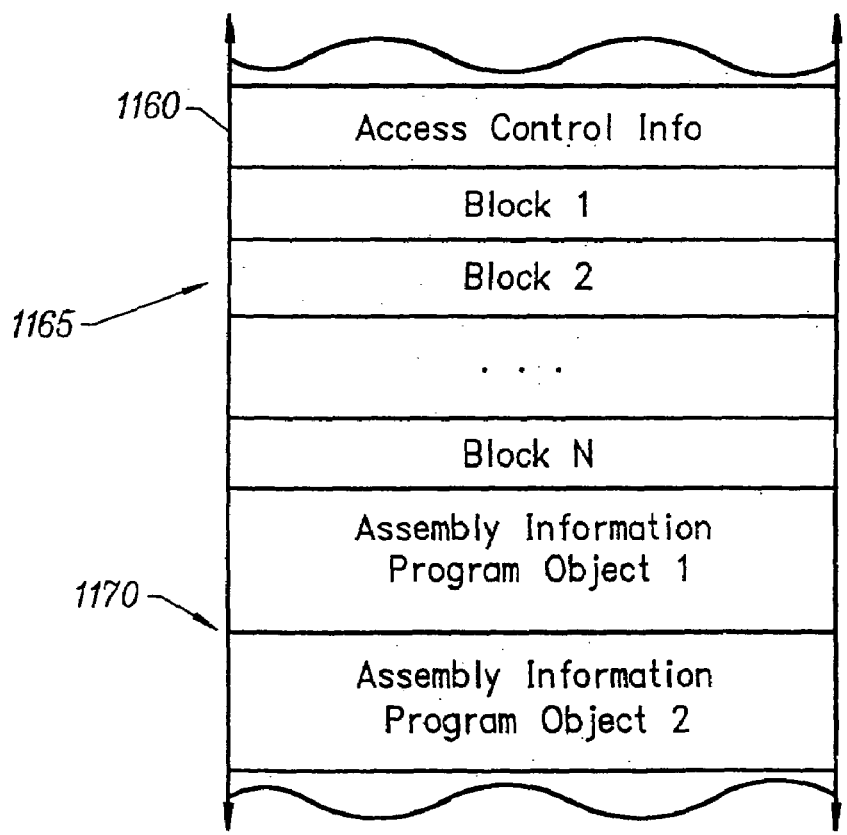
FIG. 11C is a diagram of the compressed program objects and access control information of the package of FIG. 11A.

FIGS. 11A through 11C illustrate the structure of a software package including multiple program objects. FIG. 11A provides an overall view of the software package illustrating the arrangement of an executable notifier 1110 at the head of the package, an optional signature section 1120 at the end of the package, with encrypted and compressed program objects 1 and 2 and encrypted access control information 1130 arranged between the executable notifier 1110 and the signature section 1120.

The executable notifier 1110 is illustrated in greater detail in FIG. 11B. As shown therein, the executable notifier 1110 includes a header section 1135 at the beginning of the software package, followed in turn by an executable code section 1140 and a data section 1145. The data section 1145 is followed sequentially by a resource section 1150 and an import table 1155. The resource section 1150 supplies various resources which may be employed by the executable code of section 1140, such as dialog boxes or menus. The import table 1155 includes links to various routines supplied by the operating system, such as print, copy, readfile, createfile, etc.

FIG. 11C illustrates the encrypted portions of the software package, including the encrypted access control information 1160 and the compressed program objects in the form of N blocks 1165 and respective assembly information sections 1170 for each program object.

With reference again to FIG. 11B, the executable code section 1140 of the executable notifier 1110, in general, exercises control over access to the program objects 1 and 2 and performs certain ancillary functions, as follows:

(1) When the user's system first loads the software package in memory, the executable code section 1140 runs a setup routine utilizing displays and dialog boxes supplied from the resource section 1150. The setup routine performs normal setup functions, such as a display of the relevant user license and securing the user's agreement to the license terms. The executable code section 1140 refers to information in the operating system of the user's computer to determine the language (e.g., English, French, German) in which the displays and dialog boxes are presented.

(2) The executable code section 1140 solicits and evaluates the user's requests for access to the program objects. This is achieved by displaying a dialog box when the software package is accessed by the user. The dialog box explains the user's options, such as which programs and/or program options are available without charge, which are available for a fee and which of the latter have been purchased and are still available to be used. To provide such a display, the executable code section references both the access control information section 1160 (after decrypting section 1160) and a purchase status file which is produced when the user purchases rights to use one or more objects.

(3) Where a requested use is either free, or already purchased, if not free, the executable code section 1140 decrypts and decompresses the relevant program or data object, and then loads it in memory to be run so that the requested use may be carried out. The section 1140 prevents access to unavailable uses by hooking the functions referenced in the import table of the running program object to control routines in the executable code section 1140, as explained below.

(4) The executable code section 1140 serves to deter dump attacks by erasing from memory certain necessary information from the program object when it loads the program object in running format in memory. Consequently, even if the decrypted and decompressed program object is somehow copied from the memory to some storage device, it could not be reloaded in running format in memory and, thus, is useless after a dump attack.

It will be understood that the executable code section 1140 functions as a "wrapper" or access control executable but without being susceptible to various types of attacks that prior art 15, wrappers have been subject to.

Figure 12:
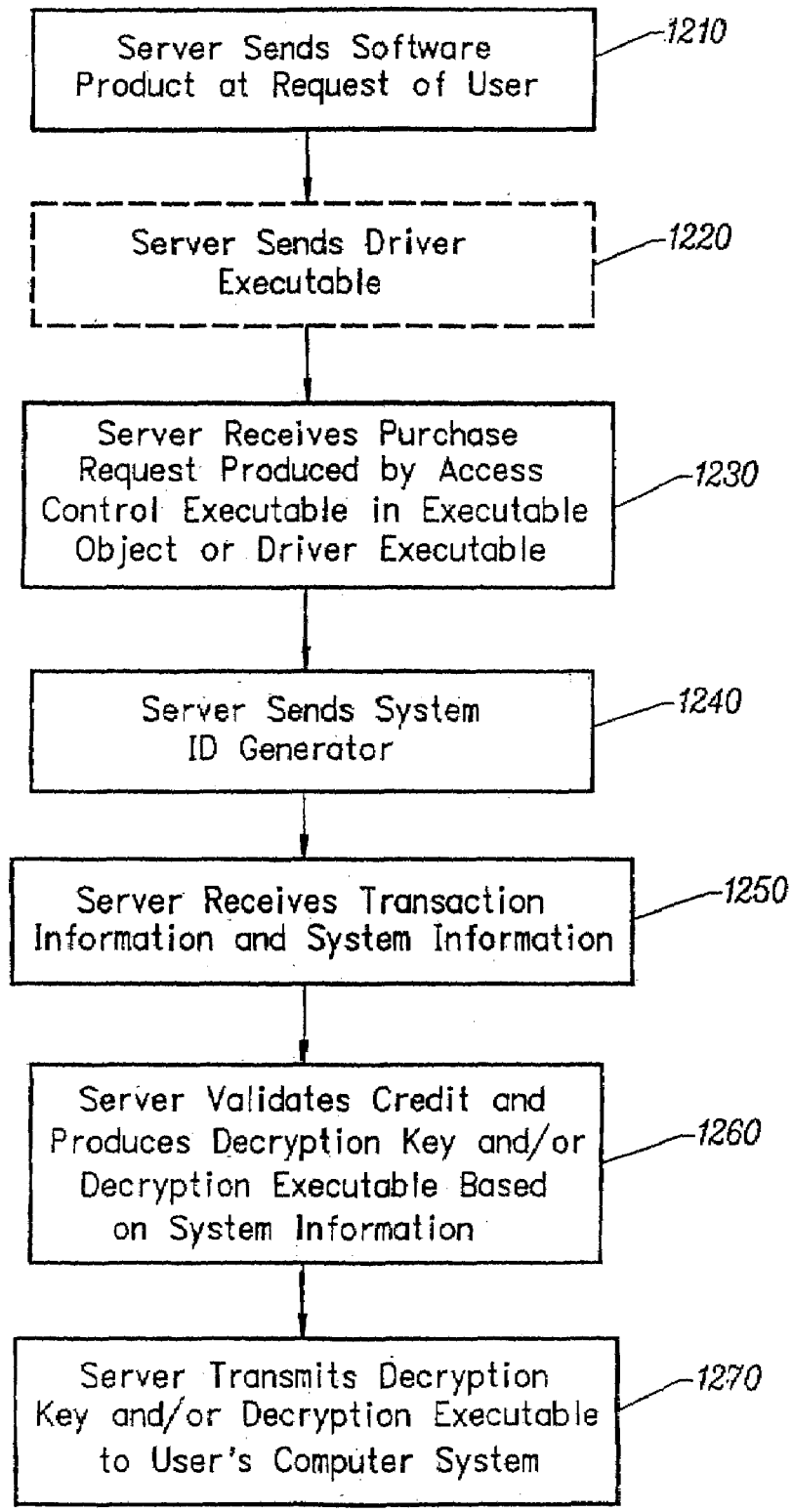
FIG. 12 is a flow diagram of a method for secure distribution of software by data communication.

FIG. 12 is a flow diagram of a method for secure distribution of software by data communication. For the purposes of FIG. 12, it will be assumed that a user's computer has been connected to a server computer by a data communication channel, such as the internet. According to an initial step 1210 in FIG. 12, the server sends a software product, which is either an executable object or a data object, to the user's computer, in response to a request sent to the server from the user's computer.

If the software product is a data object, the user's computer will require a driver executable in order to make use of the data. If the user's computer lacks the required driver executable, the user's attempt to access the data object will result only in the display of a notification to download the driver executable from the server computer. When the server computer receives such a request, it responds as indicated in step 1220 by sending the driver executable to the user's computer where it is installed to operate between its operating system and the appropriate disk or other mass storage driver thereof, as explained below in connection with FIG. 14.

Then, at step 1230, and in response to input from the user, an access control executable portion of the software product (if an executable object) or of the driver executable (if the software product is a data object) causes the user's computer to transmit a purchase request for partial or full access to the software product, and the server receives the purchase request. Step 1240 follows, at which the server sends to the user's computer a program which generates system identification information based on data that is specific to the user's computer. For example, the data used to generate the system identification information may include serial numbers of such components of the user's computer as the hard disk, the network interface card, the motherboard, and so forth. The user's computer then sends to the server the resulting system identification information, as well as information, such as a credit card number, which is required to complete the transaction. This information is received at the server, as indicated at step 1250.

Following step 1250 is step 1260, at which the server validates the credit card information and generates a decryption key and/or a decryption executable program on the basis of the system identification information received from, and specific to, the user's computer. According to one method of implementing the invention, the required decryption key is split into two parts, of which one part is calculated in the server, and the other is calculated in real time in the user's computer, using the data which is specific to components of the user's computer. The decryption key and/or decryption executable program are then transmitted to the user's computer from the server, as indicated at step 1270. The decryption key and/or decryption executable program are then used in the user's computer to decrypt the software object to which the user has just purchased usage rights. In certain embodiments, a watermark is added to the software object to store data indicative of the transaction in which the usage rights were purchased.

According to certain embodiments of the invention, the software product sent at step 1210 includes three objects, of which a first object has all of the features of a second object plus at least one additional feature. A third of the three objects has all of the features of the first object plus at least one additional object. Access to the second object is free, but access to the first and third objects requires two separate payments. If a payment arrangement is made for both of the first and third objects, the server computer provides different access control codes, such as different decryption keys, for the first and third objects, respectively. The different control codes are based on different respective information characteristic of the user's computer system.

Figure 13:
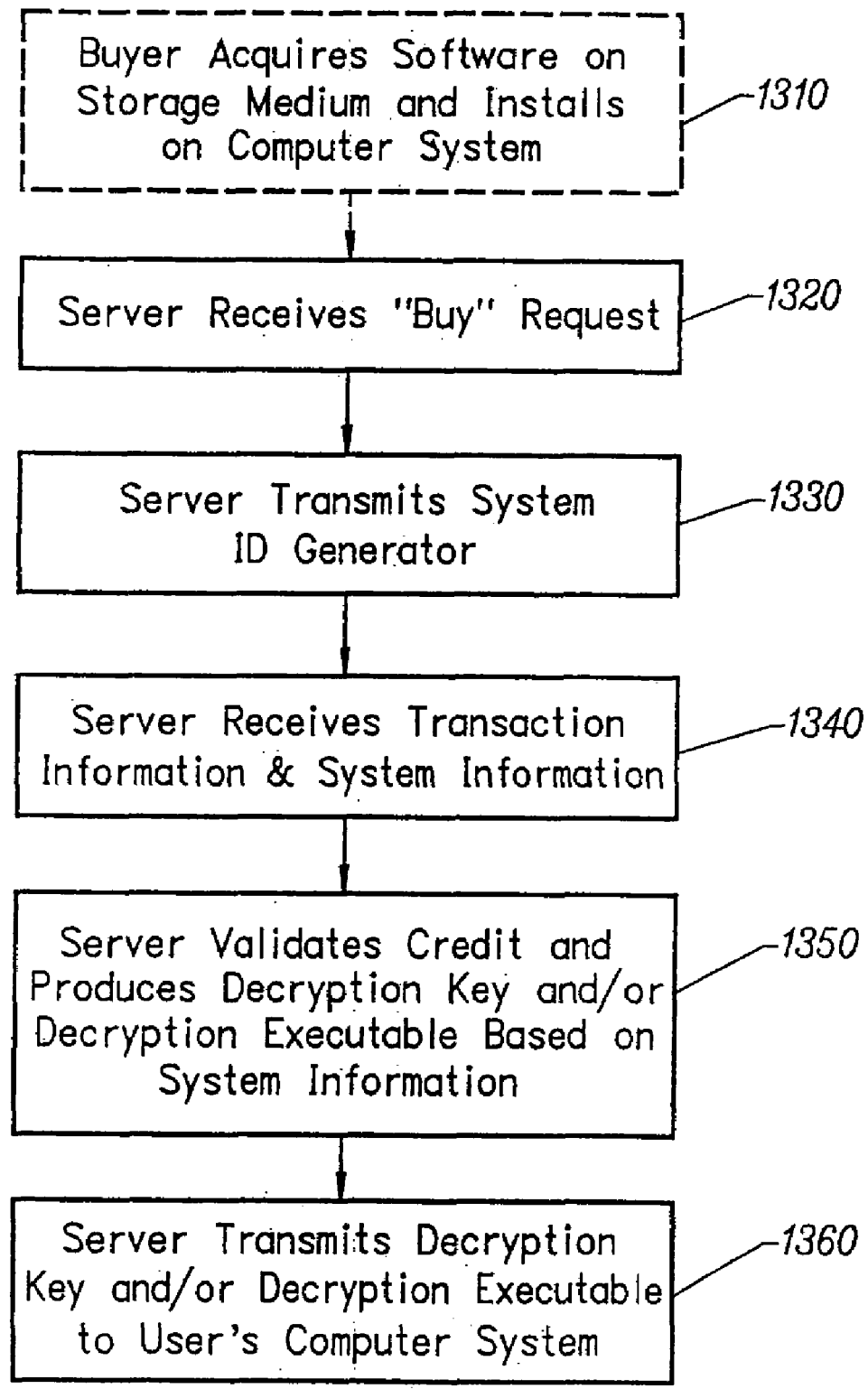
FIG. 13 is a flow diagram of a method for secure distribution of software stored in a storage medium.

FIG. 13 is a flow diagram of a method for secure distribution of software stored in a storage medium.

According to a first step 1310 in FIG. 13, software which is distributed on a storage medium is acquired by the user of a computer and installed on the user's computer. This step 1310 may have taken place a substantial period of time prior to the subsequent steps. Next, at step 1320, a server computer receives a request from the user's computer to purchase partial or full access to a software object which was installed on the user's computer in step 1310. It again is assumed that the user's computer has been connected by a communication channel to the server. Preferably the information received by the server at step 1320 includes an identification code (such as a CD serial number) which identifies the particular storage medium on which the software was distributed.

Following step 1320 are steps 1330, 1340, 1350 and 1360. These steps may be identical to steps 1240–1270 which were described above in connection with FIG. 12, except that the decryption key generated by the server at step 1350 may be based in part on the storage medium identification code. In view of the previous discussion of the corresponding steps in FIG. 12, no further explanation of FIG. 13 is necessary.

Figure 14:
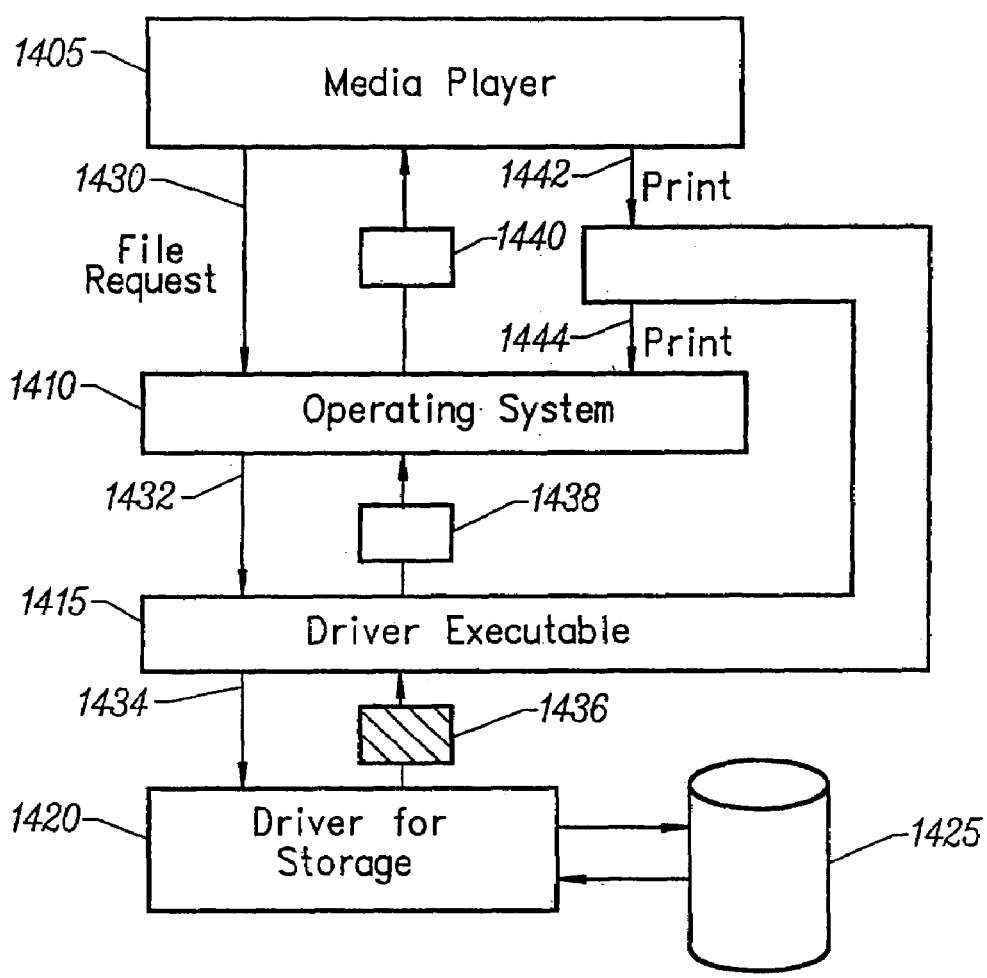
FIG. 14 is a schematic diagram illustrating the use of a driver executable for controlling access to predetermined data objects in a computer system.

FIG. 14 is a schematic diagram illustrating the use of a driver executable controlling access to data objects stored in a computer system. The software architecture illustrated in FIG. 14 includes a media player application 1405 which is provided to read or play data objects such as images. Also included is a conventional operating system 1410 and a driver executable program 1415 of the type referred to in connection with step 1220 in FIG. 12, or which is distributed on the storage medium referred to at step 310 in FIG. 13.

Also illustrated in FIG. 14 are a conventional driver program 1420 which is provided for managing a storage device, and a storage device 1425 on which one or more data objects are stored.

FIG. 14 also illustrates a process by which a data object stored on the storage device 1425 is accessed by the media player application 1405, as well as a process for requesting printing of the accessed object.

When the user of the computer system enters an input to request access to a data object stored on the storage device 1425, a request to that effect is passed from the media player application 1405 to the operating system 1410, as indicated at reference numeral 1430 in FIG. 14. In response to the request 1430, the operating system 1410 passes a second request (represented by reference numeral 1432) to the driver executable 1415. In response to the request 1432, the driver executable 1415 passes a third request (reference numeral 1434) to the storage device driver 1420. In response to the request 1434, the storage device driver 1420 retrieves the desired data object from the storage device 1425. The desired object is then passed from the storage device driver 1420 to the driver executable 1415 either in encrypted form, as indicated at 1436, or in unencrypted form. If the user has satisfied the condition for access to the data object (e.g., by paying the purchase price for access), then the driver executable decrypts the encrypted data object and passes the decrypted data object to the operating system 1410, as indicated at 1438. The decrypted data object is then passed from the operating system to the media player application, as indicated at 1440.

If the user wishes to print the data object, then a request 1442 is passed from the media player application to the driver executable, which then passes another print request 1444 to the operating system.

Figure 15:
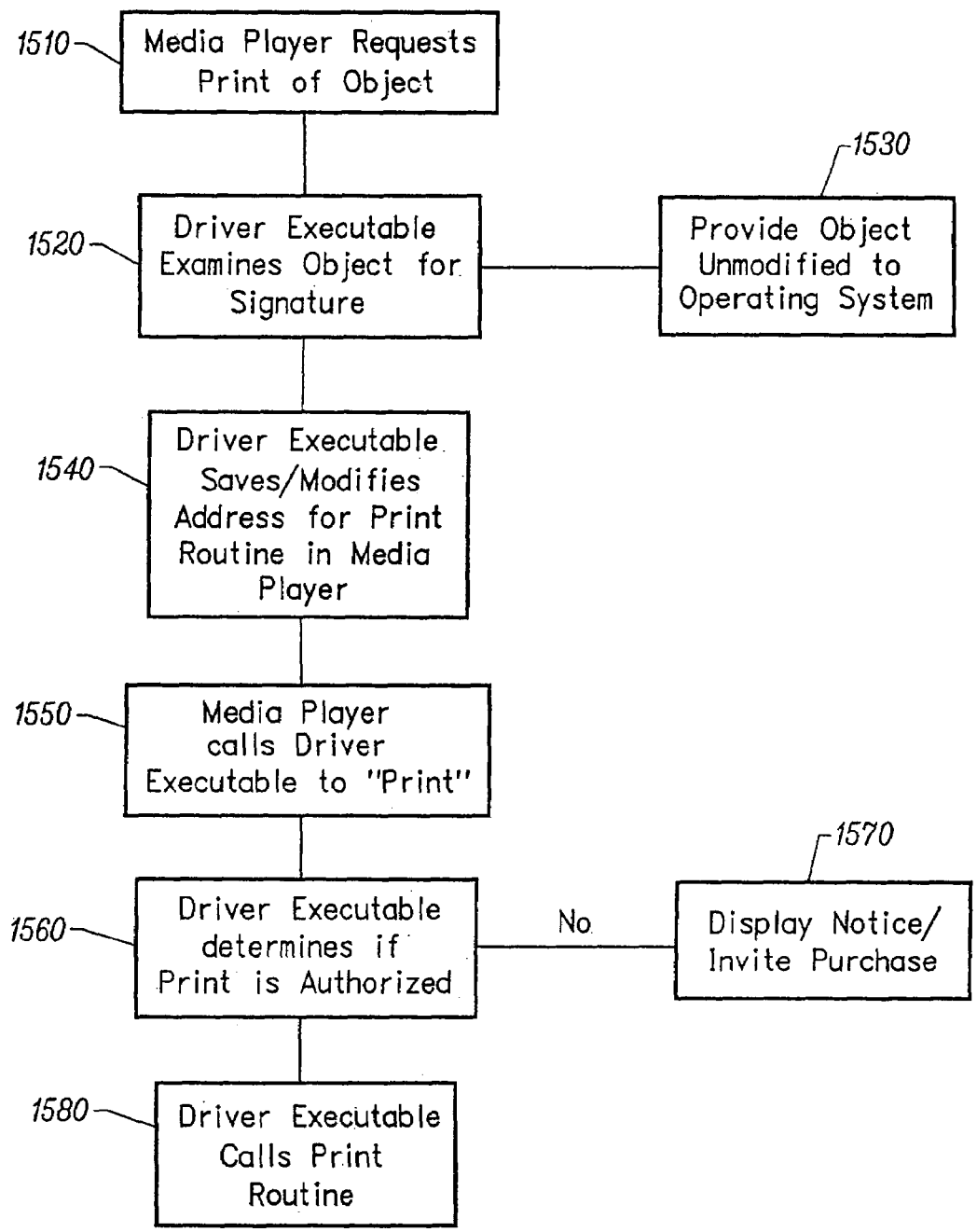
FIG. 15 is a flow diagram of a method of printing a data object to which access is controlled.

FIG. 15 is a flow diagram which shows additional details of a method of printing a data object to which access is controlled. In response to input from the user of the computer, the media player transmits the print request (reference numeral 1442 in FIG. 14), as represented by step 1510 in FIG. 15, to the driver executable. The driver executable then examines the object to determine whether identifier data such as a signature is present in the object to indicate that printing of the object is subject to some restriction (step 1520). If at step 1520 no such identifier is found, then, as indicated at step 1530, the driver executable provides the data object in an unmodified form to the operating system.

If at step 1520 the driver executable finds the signature which identifies the object as one for which access is controlled, step 1540 follows. At step 1540 the driver executable saves or modifies the target address in the media player application to which the application directs calls for a print routine. Consequently, as indicated at step 1550, when the media player calls a print routine, the call is directed to the driver executable. However, if step 1540 has already been carried out as a result of a previous print request from the media player, this step need not be repeated.

At step 1560, and in response to the call for the print routine from the media player application, the driver executable determines whether the customer has satisfied the conditions required to authorize printing of the data object. If not, the driver executable causes the computer system to display a suitable notice to indicate to the user that printing is denied, and to invite the user to purchase the right to print the data object (step 1570), as described hereinabove.

If at step 1560 the driver executable determines that printing is authorized, then the driver executable calls the print routine provided by the operating system (step 1580).

Figure 16:
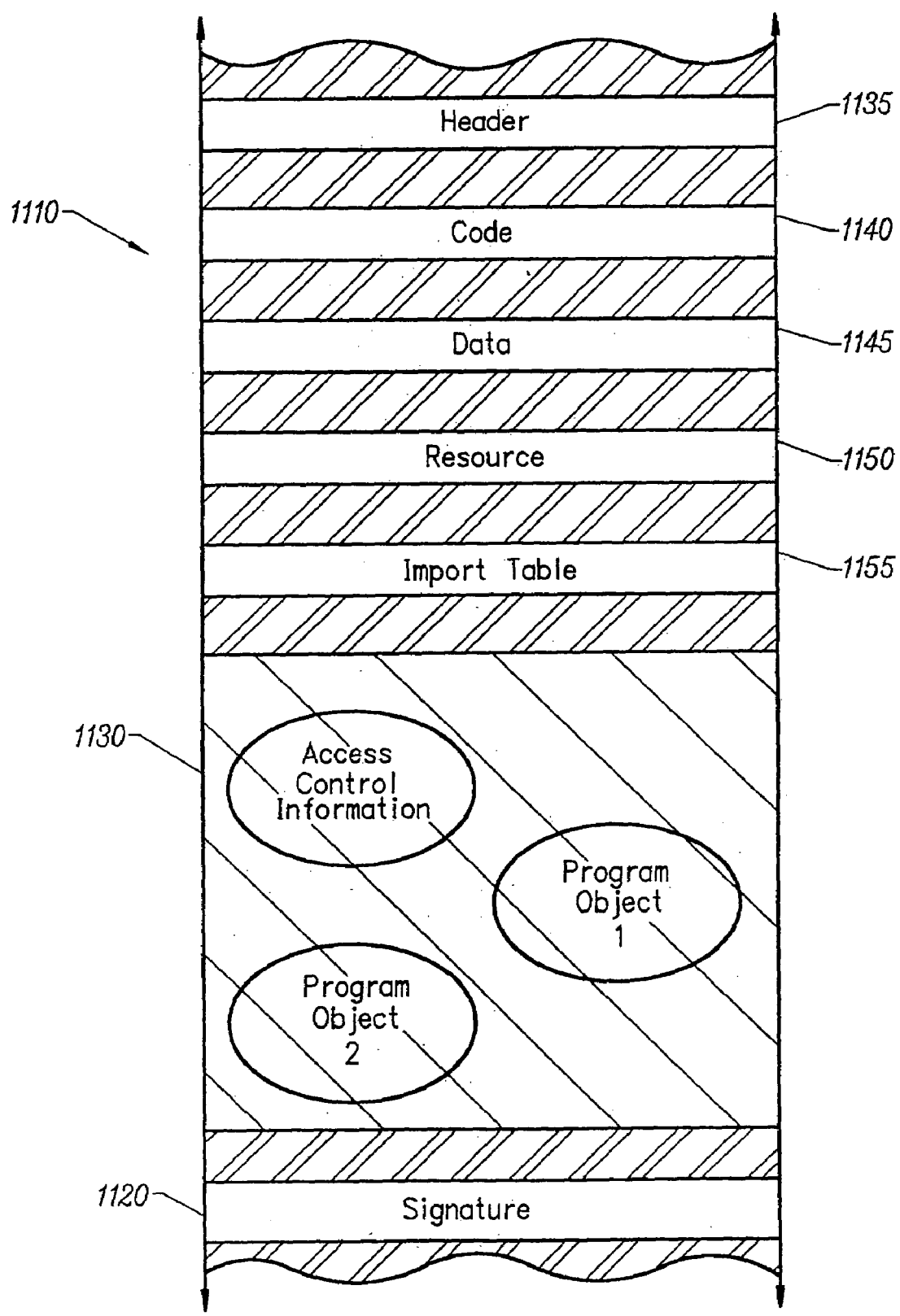
FIG. 16 illustrates the software package of FIGS. 11A through 11C when it is first loaded in the memory of a user's computer system.

FIG. 16 illustrates the software package of FIGS. 11A–11C when the software package is first loaded into the working memory of a user's computer system. As before, the executable notifier 1110 is made up of a header section 1135, followed in turn by a executable code section 1140, a data section 1145, a resource section 1150 and an import table 1155.

Following the executable notifier 1110 are the encrypted and compressed program objects and encrypted access control information, all indicated by reference numeral 1130, and the signature section 1120, which were referred to above in connection with FIG. 11A.

Figure 17:
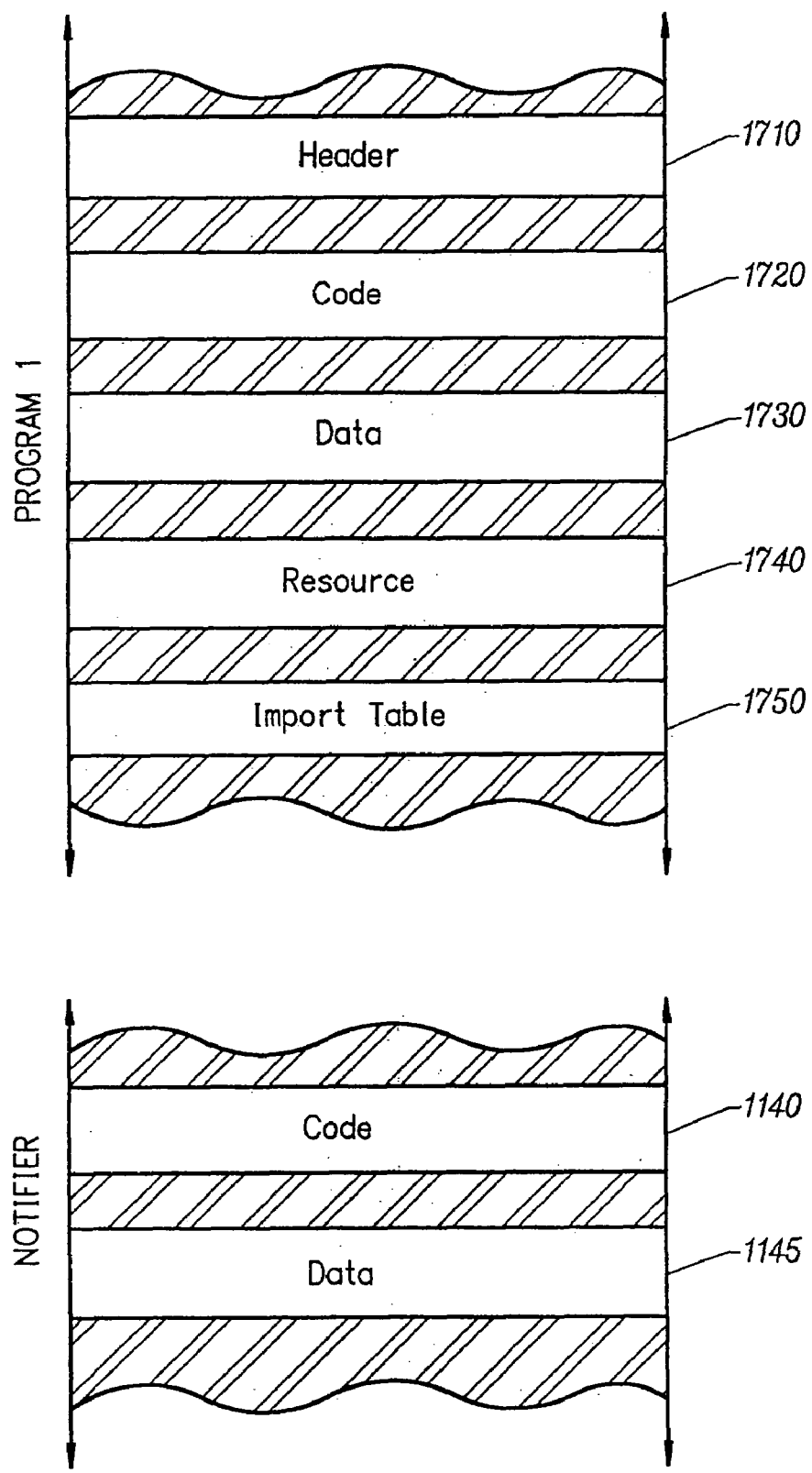
FIG. 17 illustrates portions of the software package of FIG. 16 after the executable notifier has loaded a selected one of the program objects in running condition in the memory of the user's computer system.

If the user requests access to one of the program objects, say object 1, and if access to the object has been authorized, then the executable notifier decrypts and decompresses the program object and causes the program object to be written in executable form as indicated in FIG. 17. As seen from FIG. 17, the decrypted, decompressed program object includes a header section 1710, followed in turn by an executable code section 1720, a data section 1730, a resource section 1740, and an import table 1750.

After the program object has been written in memory in executable form as shown in FIG. 17, the executable notifier modifies the program object in a manner to defeat dump attacks. This is achieved by erasing or modifying certain portions of the program object after it is written in memory. In certain embodiments, one or more of the program object's relocation information, directory pointers or its entry point pointer are erased or modified for this purpose. In other embodiments, one or more of the references to exterior routines in the import table of the program object are modified to enable the executable notifier to control access to such routines. This modification of the program object is referred to as "hooking" routine calls by the program objects. This is done by modifying the import table 1750 so that routine calls are routed through the executable notifier instead of directly to the operating system. Details of the "hooking" process will now be described with reference to FIG. 18.

Figure 18:
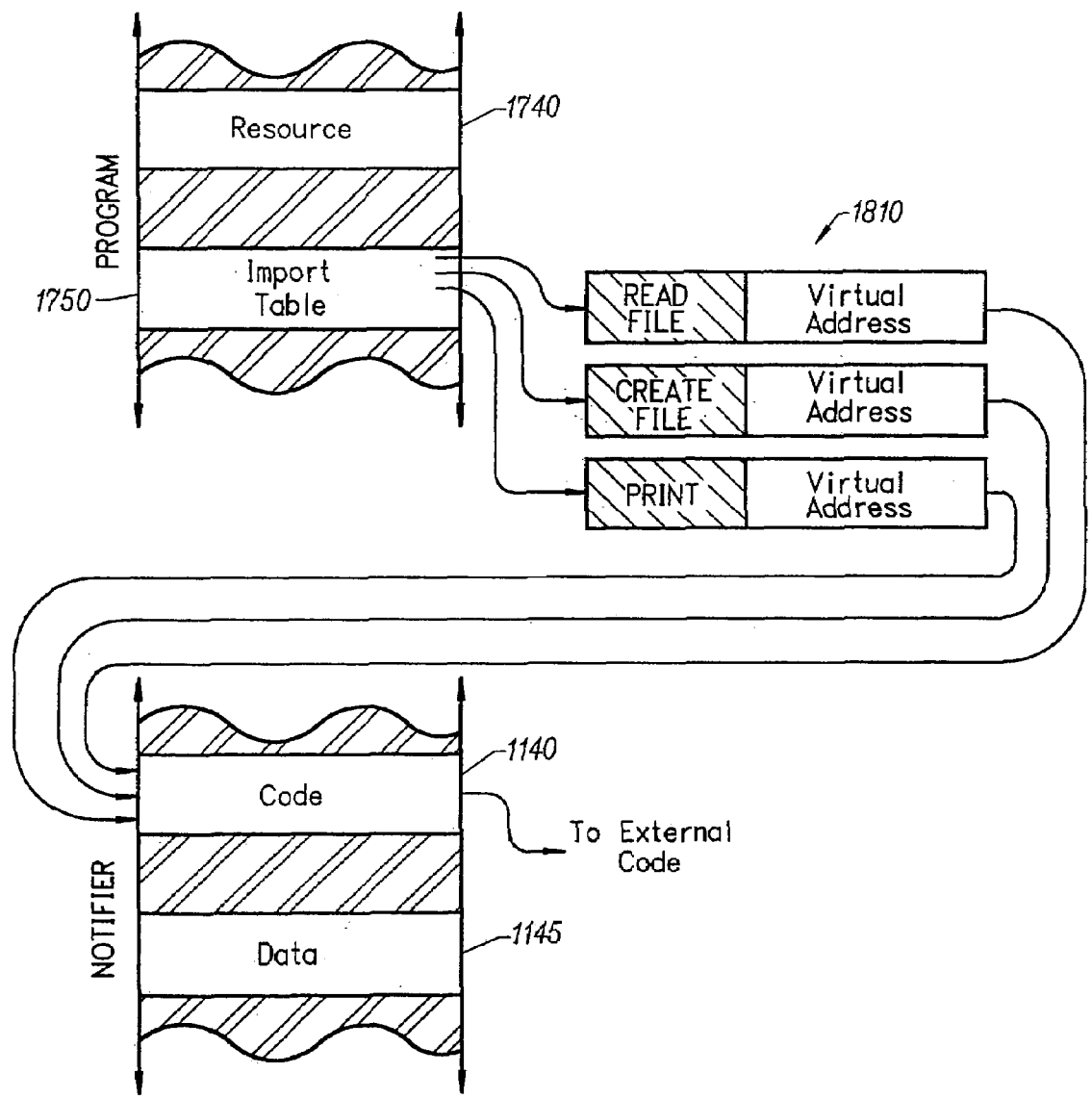
FIG. 18 illustrates a method for controlling the usage of a given program by means of code in the executable notifier.

As indicated at 1810 in FIG. 18, the executable notifier erases portions of the import table that identify the routines to be called by the corresponding virtual address such as "read file", "create file", or "print". Instead of addresses to the operating system routines, the executable notifier inserts virtual addresses in the import table which cause jumps to the code section 1140 of the executable notifier. The code section 1140 is programmed to interpret each jump to determine the particular routine requested by the program object. The executable notifier then determines whether the user has satisfied the conditions to perform the function in question. If so, the executable notifier calls the appropriate routine in the operating system. To elaborate details of the "hooking" process shown in FIG. 18, the executable notifier stores in an address record portion of the import table 1750 addresses within the executable notifier in place of the addresses of the relevant routines in the operating system. Instead of erasing part of, and making substitutions for, the import table 1750 of the program object, the executable notifier may erase and substitute for other portions of the program object, such as relocation information, a directory pointer or an entry point pointer.

The above description of the invention is intended to be illustrative and not limiting. Various changes or modifications in the embodiments described may occur to those skilled in the art. These can be made without departing from the spirit or scope of the invention.

What is claimed is:

1. A method of securely distributing software with limited usage rights, comprising:
   supplying a software package, containing software therein, for distribution to a user, the software including an access control object for preventing at least some usage of the software on a computer system without the use of a first access control code, wherein the software includes data defining a notifier which the software causes to be displayed by means of the computer system, the notifier conveying information required by the user for ordering rights to predetermined usage of the software and enabling entry of first transaction information required for the purchase of the rights;
   receiving at a server a request from the user to purchase the rights to predetermined usage of the supplied software;
   receiving at the server selected information characteristic of the computer system;
   obtaining payment information from the user assuring payment for the rights;
   producing the first access control code based on the selected information, wherein the first access code comprises decryption means produced from the selected information; and
   supplying the first access control code from the server to the predetermined computer system in response to receipt of the payment information to enable the at least some usage of the supplied software;
   wherein the access control object comprises an access control executable controlling access to the software by referencing the first access control code and the selected information in the computer system.

2. The method of claim 1, wherein the step of supplying a software package comprises supplying the software package to the computer system, the software therein having a first object and a second object, the access control object comprising an access control executable controlling access to the first and second objects by referencing the first access control code and the selected information in the computer system.

3. The method of claim 2, wherein the step of supplying the first access control code comprises supplying a usage authorization package including the first access control code and information identifying authorized usages of the software, the access control executable being operative to reference the usage authorization package in controlling access to the first and second objects, the software being operative to store the usage authorization package apart from the first and second objects.

4. The method of claim 2, wherein the first object provides a first set of a plurality of features, the second object provides a second set of a plurality of features including some, but less than all, of the features included in the first set and the access control executable is operative to prevent access to the first object in the absence of the first access control code and the selected information but to enable access to the second object without reference to the first access control code or the selected information.

5. The method of claim 4, wherein the software includes a third object providing the first set of a plurality of features together with a third set including at least one feature not included in the first set, the executable being operative to prevent access to the third object in the absence of a second access control code different from the first access control code and further selected information characteristic of the computer system, the second access control code being produced based on the further selected information, the method further comprising:
   supplying the second access control code to the computer system.

6. The method of claim 2, wherein the access control executable comprises a wrapper for the first and second objects.

7. The method of claim 1, wherein the decryption means comprises a decryption key.

8. The method of claim 1, wherein the decryption means comprises a decryption executable.

9. The method of claim 1, wherein the first access control code further comprises a watermark in an object supplied to the computer system.

10. The method of claim 1, wherein the software includes transaction information relating to a transaction by which the software is supplied to the user, and the access control object is operative to prevent the at least some usage of the software in the absence of the transaction information.

11. The method of claim 10, wherein the transaction information is supplied as a watermark in the software.

12. The method of claim 1, further comprising the steps of storing the first access control code at a location in the computer system apart from a location at which the software is stored.

13. The method of claim 1, further comprising supplying a system information collection code from the server to the computer system, the system information collection code being operative to obtain the selected information characteristic of the predetermined computer system.

14. The method of claim 1, wherein the software is operative to obtain the selected information from the predetermined computer system in response to entry of the payment information and to cause the computer system to transmit the selected information and the first transaction information to the server.

15. The method of claim 14, wherein the software is operative to reference information in an operating system of the computer system identifying a language selected for providing outputs to a user and to cause the software to provide such outputs in the selected language.

16. The method of claim 14, wherein the software is supplied as a software copy on a storage medium for distribution to the user, the software including an identification code identifying the software copy, the software is operative to transmit the identification code to the server, the server being operative to produce the first access control code based on the identification code.

17. The method of claim 14, wherein the software is supplied by data communication from a server to the predetermined computer system in response to a request, the request including second transaction information, the server being operative to insert transaction identification information in the software based on the second transaction information.

18. The method of claim 17, wherein the server is operative to insert the transaction identification information in the software as a watermark.

19. The method of claim 17, wherein the server is operative to produce the first access control code based on the second transaction information.

20. The method of claim 19, wherein the server is operative to supply the first access control code with an identifying watermark.

21. The method of claim 1, wherein the software comprises a first data object.

22. The method of claim 21, wherein the first data object includes a first set of features and a second set of features, the first set of features being encrypted and the second set of features being unencrypted, and wherein the step of supplying software comprises supplying a driver executable to the computer system, the driver executable including first code for accessing the first data object and decryption code for controlling decryption of the first data object.

23. The method of claim 21, wherein the first data object is encrypted, the step of supplying software including supplying a driver executable to the computer system, the driver executable including first code for accessing the first data object and decryption code for decrypting the accessed first data object.

24. The method of claim 23, wherein the driver executable is operative to receive a request for the first data object from an operating system of the computer system and to transfer the request to a preexisting driver of the computer system, the driver executable being further operative to receive the first data object from the preexisting driver, to decrypt the first predetermined object and supply the decrypted first predetermined object to the operating system.

25. The method of claim 24, wherein the first data object includes a predetermined identifier therein and the driver executable includes second code for detecting the presence of the predetermined identifier in the first data object, the decryption code being operative to decrypt the first data object in response to the presence of the predetermined identifier therein.

26. The method of claim 25, wherein the driver executable is operative to transfer a file from the preexisting driver to the operating system without modification in the absence of the predetermined identifier in the file as received from the preexisting driver.

27. The method of claim 23, wherein the first data object provides a first set of a plurality of features, the software further comprising a second data object providing a second set of a plurality of features including some, but less than all, of the features included in the first set, and a usage authorization package including information identifying authorized usages of the first and second data objects, the driver executable being operative to selectively enable usage of the first and second data objects based on the usage authorization package.

28. The method of claim 27, wherein the driver executable is operative upon a first request for access to the first or second data object to return a dialog box object for displaying a dialog box to the user, the dialog box providing the user with options for accessing the first and second data objects on a pay and/or no-pay basis.

29. The method of claim 28, wherein the driver executable is operative upon the first request for access to the first or second data object to reference information in the operating system identifying a display language selected for producing displays to a user and to provide the dialog box with text in the display language.

30. The method of claim 21, wherein only a portion of the first data object is encrypted, and wherein the step of supplying software comprises supplying a driver executable and a usage authorization package to the computer system, the usage authorization package including information identifying authorized usages of the first data object, the driver executable being operative to access the first data object and to transfer the first data object to an operating system of the computer system, wherein the driver executable selectively decrypts the portion of the first data object before transferring the first data object to the operating system based on the usage authorization package.

31. The method of claim 21, wherein the step of supplying software comprises supplying a driver executable to the predetermined computer system, the driver executable including first code for accessing the first data object in response to a request from an operating system of the computer system and being operative to determine whether a requested action utilizing the first data object is authorized, the driver executable being operative to block execution of the requested action when the same is not authorized.

32. The method of claim 31, wherein the driver executable is operative to block execution of the requested action by hooking a routine of an external executable required for performing the requested action.

33. The method of claim 21, wherein the software comprises a second data object, wherein the method further comprises producing the second data object from the first data object by reducing the information content of the first data object.

34. The method of claim 33, wherein the second data object is produced by eliminating data from the first data object.

35. The method of claim 33, wherein the second data object is produced by adding noise to the first data object.

36. The method of claim 33, wherein the second data object is produced by filtering the first data object.

37. The method of claim 33, wherein the second data object is produced by encrypting portions of the first data object.

38. The method of claim 21, wherein the software comprises a second data object, and wherein the method further comprises producing the first data object from the second data object by adding data to the second data object.

39. The method of claim 1, wherein the software comprises a first executable object.

* * * * *